(12) United States Patent
Foss

(10) Patent No.: US 10,761,349 B2
(45) Date of Patent: *Sep. 1, 2020

(54) DUAL-FRAME EYEGLASSES

(71) Applicant: Arthur N. Foss, Seattle, WA (US)

(72) Inventor: Arthur N. Foss, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,909

(22) Filed: Feb. 1, 2019

(65) Prior Publication Data

US 2019/0179168 A1 Jun. 13, 2019

Related U.S. Application Data

(63) Continuation-in-part of application No. 15/423,401, filed on Feb. 2, 2017, now Pat. No. 10,394,055.

(51) Int. Cl.
  *G02C 7/08* (2006.01)
  *G02C 5/00* (2006.01)
  *G02C 5/20* (2006.01)

(52) U.S. Cl.
  CPC ............. *G02C 7/088* (2013.01); *G02C 5/006* (2013.01); *G02C 5/20* (2013.01); *G02C 7/08* (2013.01); *G02C 7/086* (2013.01); *G02C 2200/02* (2013.01); *G02C 2200/18* (2013.01)

(58) Field of Classification Search
  CPC .......... G02C 7/08; G02C 7/086; G02C 7/088; G02C 9/00; G02C 9/02
  USPC ................................................ 351/57, 58, 59
  See application file for complete search history.

(56) References Cited

U.S. PATENT DOCUMENTS

| 1,833,792 | A | * | 11/1931 | Pfaus | ..................... | G02C 5/143 |
| | | | | | | 351/123 |
| 5,002,381 | A | * | 3/1991 | Murrell | ................... | G02C 3/003 |
| | | | | | | 351/123 |
| 6,464,354 | B1 | | 10/2002 | Chen et al. | | |
| 6,474,811 | B2 | | 11/2002 | Liu | | |

(Continued)

FOREIGN PATENT DOCUMENTS

| CN | 104166246 B | | 4/2016 |
| CN | 105759459 A | * | 7/2016 |
| CN | 105759459 A | | 7/2016 |

OTHER PUBLICATIONS

English machine translation of CN-105759459-A (Year: 2016).*

(Continued)

*Primary Examiner* — Nicholas R. Pasko
(74) *Attorney, Agent, or Firm* — Han Santos, PLLC

(57) ABSTRACT

Dual-frame eyeglasses that include a foundation eyeglass frame that may be worn on the user's head, and a pivot eyeglass frame that is rigidly coupled to the foundation eyeglass frame via a pair of pivot mechanisms. The pivot eyeglass frame may be substantially similar in form and profile to the foundation eyeglass frame. The pivot eyeglass frame may be configured to incrementally rotate about the pivot mechanism from a first position that substantially overlaps a user's line of sight through to a second position that is angularly offset away from the user's line of sight. Additionally, the foundation eyeglass frame may include a nose bridge that separates into two elements at a coupling point on the nose bridge to facilitate each half of the foundation eyeglass frame folding into a separate, compact form.

9 Claims, 23 Drawing Sheets

(56) References Cited

U.S. PATENT DOCUMENTS

| | | | |
|---|---|---|---|
| 6,488,372 B1* | 12/2002 | Park | G02C 9/00 351/47 |
| 7,018,038 B2* | 3/2006 | Yoshida | G02C 3/003 351/111 |
| 7,040,749 B2 | 5/2006 | Smith | |
| 7,229,168 B2 | 6/2007 | Kidouchim | |
| 7,325,922 B2* | 2/2008 | Spivey | G02C 7/02 351/159.04 |
| 7,338,159 B2* | 3/2008 | Spivey | G02C 7/02 351/159.18 |
| 8,210,676 B1 | 7/2012 | Hunt | |
| 10,394,055 B2* | 8/2019 | Foss | G02C 5/006 |
| 2007/0091257 A1 | 4/2007 | Spivey | |
| 2009/0279046 A1* | 11/2009 | Dreher | G02C 9/00 351/55 |
| 2015/0219930 A1 | 8/2015 | Cohn | |
| 2018/0217403 A1* | 8/2018 | Foss | G02C 5/006 |

OTHER PUBLICATIONS

Final Office Action for U.S. Appl. No. 15/423,401, dated Feb. 8, 2019, 25 pages.
Non-Final Office Action for U.S. Appl. No. 15/423,401, dated Oct. 1, 2018, 19 pages.
The International Search Report and Written Opinion for PCT Application No. PCT/US1208/016606, dated Jul. 11, 2018, 15 pages.

* cited by examiner

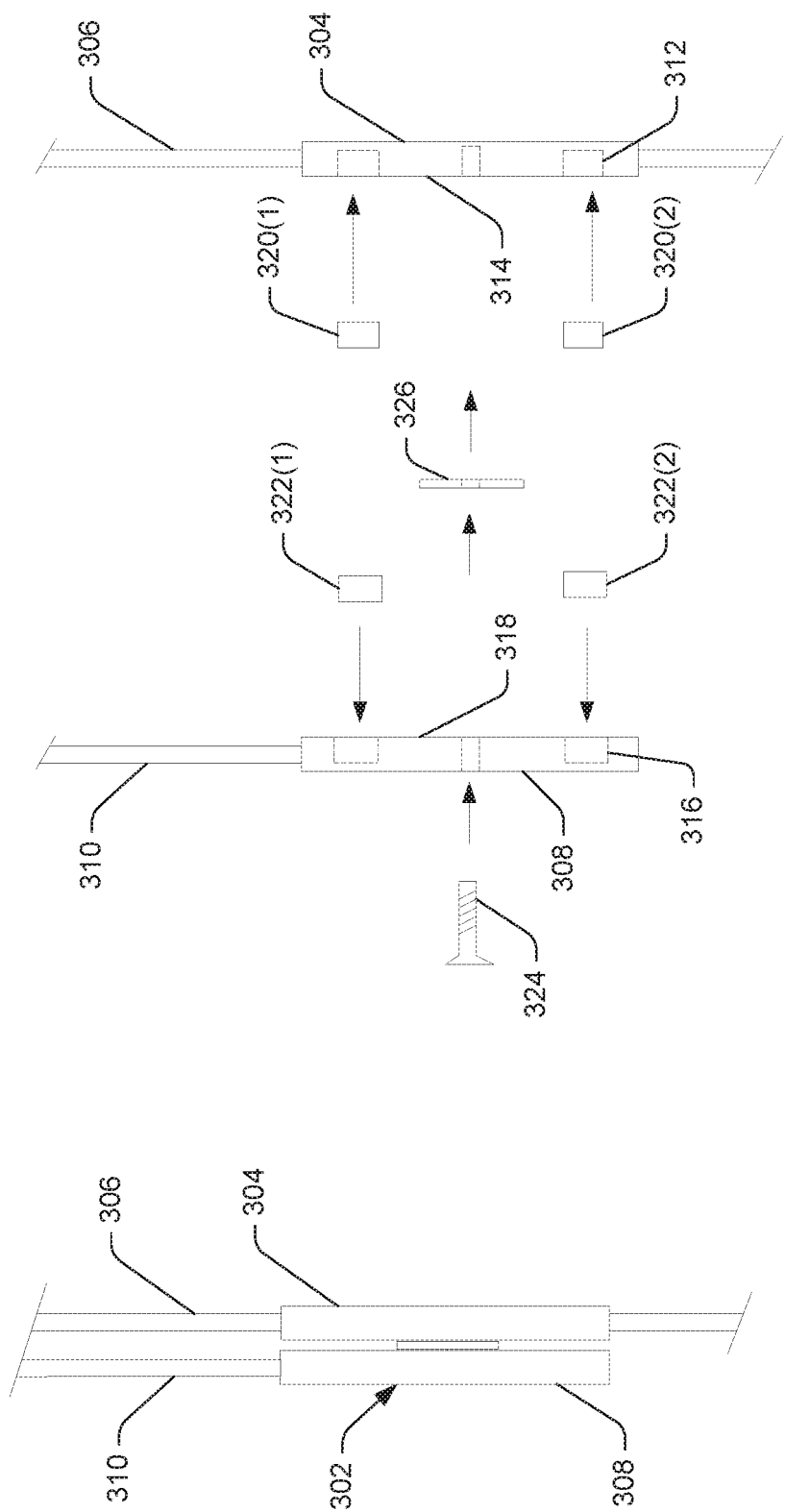

(Exploded View of FIG. 4A)

(Section A-A of FIG. 5A)

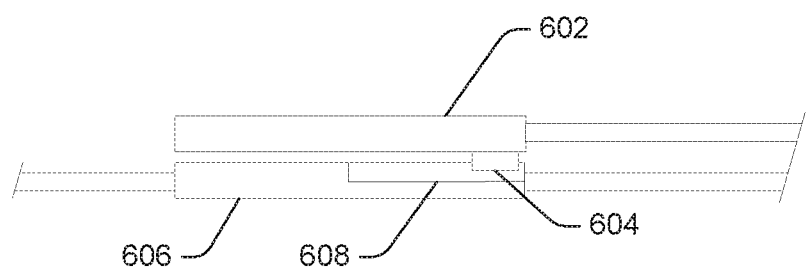
FIG. 6A
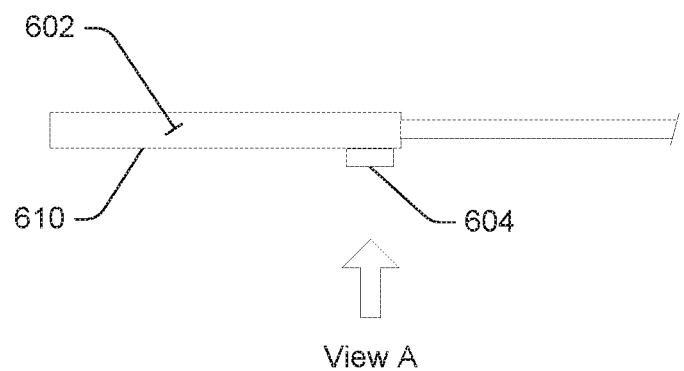
View A
View B
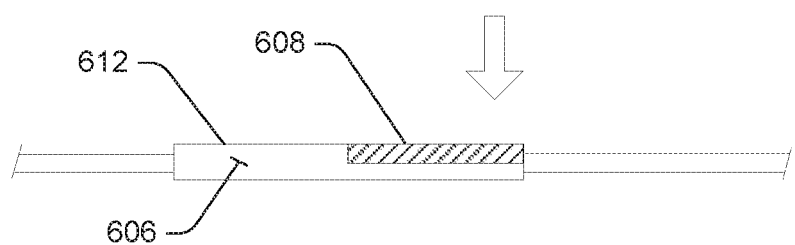
FIG. 6B
(Exploded View of FIG. 6A)

(View A of FIG. 6B)

(View B of FIG. 6B)

(Detail A of FIG. 8A)

(Exploded view of FIG. 16A)

(Section A-A of FIG. 16B)

(Section B-B of FIG. 16B)

DUAL-FRAME EYEGLASSES

RELATED APPLICATIONS

This application claims priority to a co-pending, commonly owned U.S. patent application Ser. No. 15/423,401 filed on Feb. 2, 2017, and titled "Dual-Frame Eyeglasses," which is herein incorporated by reference in its entirety.

BACKGROUND

Eyeglasses are widely used to correct vision, protect eyes from sun or debris, and/or for other purposes. Many people may use eyeglasses while performing particular tasks and choose to remove their eyeglasses when they are not in use. For example, a user may be momentarily reading text that would necessitate wearing corrective lens eyeglasses, or momentarily performing a task that would necessitate wearing protective eyeglasses. In each of these instances, the user may prefer to use their pair of corrective lens eyeglasses or protective eyeglasses, while performing their particular task, and then store each respective pair of eyeglasses away for future use. However, it can be difficult, and at times, inconvenient for a user to find a place to store their eyeglasses when they are not in use, particular when eyeglasses are being used intermittently with short time intervals between each use. This may lead to eyeglasses becoming lost or damaged.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a front view of the pair of dual-frame eyeglasses. FIG. 1B illustrates a plan view of the pair of dual-frame eyeglasses.

FIGS. 3A and 3B illustrate an exemplary embodiment of a pivot mechanism for the dual-frame eyeglasses. Particularly, FIG. 3A illustrates a plan view of the pivot mechanism, and FIG. 3B illustrates an exploded view of the pivot mechanism shown in FIG. 3A.

FIG. 4A illustrates a plan view of the pivot mechanism, and FIG. 4B illustrates an exploded view of the pivot mechanism shown in FIG. 4A.

FIG. 5A illustrates a plan view of the dual frame eyeglasses, showing the pair of arm catches. FIG. 5B illustrates a cross-sectional view through Section A-A of FIG. 5A.

FIGS. 6A through to 6D illustrate an exemplary pivot mechanism of the dual-frame eyeglasses. FIG. 6A illustrates a pivot mechanism comprising a pivot plate with a rotational stop and a base plate with a recess seat. FIG. 6B illustrates an exploded view of FIG. 6A.

FIG. 7A illustrates a first alignment of the pivot eyeglass frame and the foundation eyeglass frame. FIG. 7B illustrates a second alignment of the pivot eyeglass frame relative to the foundation eyeglass frame.

FIG. 8B illustrates a detail view at Detail A of FIG. 8A.

FIG. 9A illustrates a first configuration of the pair of dual-frame eyeglasses that are unfolded for use. FIG. 9B illustrates a second configuration of the pair of dual-frame eyeglasses, whereby the pair of dual-frame eyeglasses are folded into a compact form.

FIG. 10A illustrates a furthermost angular orientation of the pivot eyeglass frame relative to the foundation eyeglass frame.

FIG. 11A illustrates a furthermost angular orientation of the pivot eyeglass frame relative to the foundation eyeglass frame.

FIG. 12A illustrates a furthermost angular orientation of the pivot eyeglass frame relative to the foundation eyeglass frame.

FIG. 13A illustrates a front view of the pair of dual-frame eyeglasses, and FIG. 13B illustrates a corresponding plan view.

FIG. 16A illustrates the plan view of an assembly comprising a left-hand temple arm of the foundation eyeglass frame and left-hand pivot arm of the pivot eyeglass frame.

FIG. 17A illustrates a plan view of the temple arm of the foundation eyeglass frame and FIG. 17B illustrates a side view of the temple arm.

FIG. 18A illustrates a plan of the pivot arm of the pivot eyeglass frame and FIG. 18B illustrates a side view of the pivot arm.

DETAILED DESCRIPTION

Figure 1A:
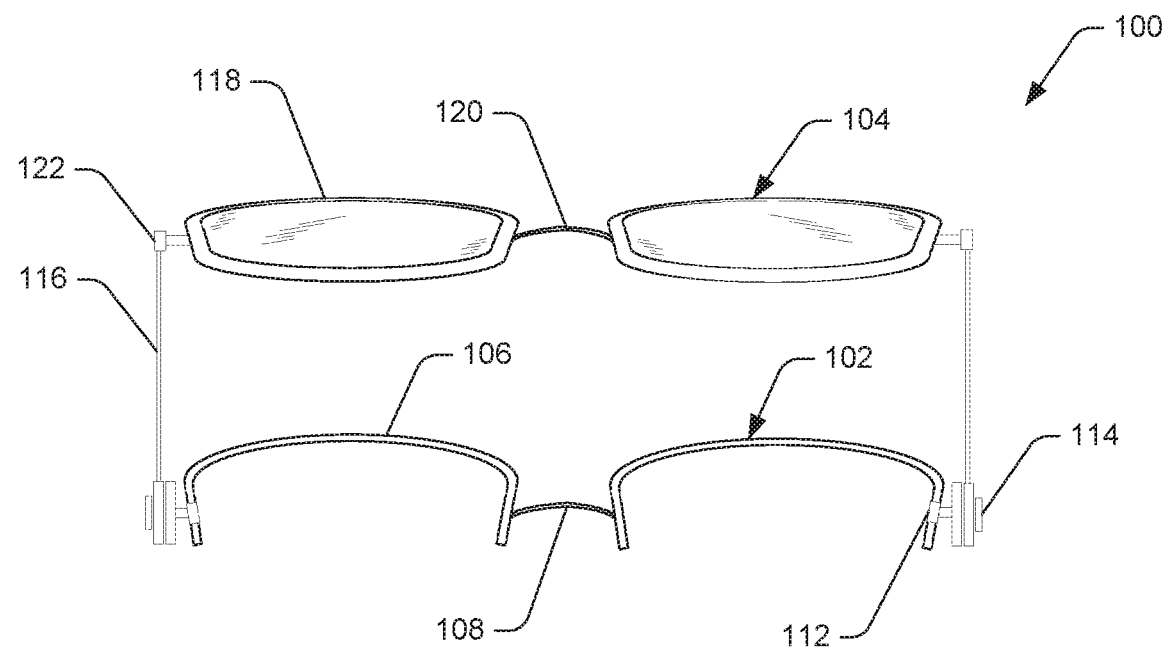
FIGS. 1A and 1B illustrates an exemplary embodiment of a pair of dual-frame eyeglasses.

The disclosure herein describes apparatuses for dual-frame eyeglasses. The dual-frame eyeglasses may include a first set of eyeglasses and a second set of eyeglasses that are rigidly coupled to each other via a pair of pivot mechanisms. In some examples, the first set of eyeglasses, also known as a foundation eyeglass frame, may be worn on the user's head. In some examples, foundation eyeglass frame may resemble a typical eyeglass frame without a pair of eyeglass lenses. This configuration may allow a user to avoid seeing through lenses while still wearing the pair of dual-frame eyeglasses. In other examples, the foundation eyeglass frame may include a pair of lenses that are different to lenses installed on the pivot eyeglass frame. This configuration may allow a user to selectively see through a first pair of lenses of the foundation eyeglass frame, and optionally through a combination of the first pair of lenses and a second pair of lenses of the second set of eyeglasses. The lenses may include corrective lenses, protective lenses, sunglass lenses, or any other type of eyeglass lens. Further, the second set of eyeglasses, also known as a pivot eyeglass frame, may be rigidly coupled to the foundation eyeglass frame via a pair of pivot mechanisms. In some examples, each pivot mechanism may be integrated into the temple arms of the foundation eyeglass frame. In some examples, the pivot mechanism may facilitate a coupling of the foundation eyeglass frame and a pivot eyeglass frame via a set of magnets, fasteners, or a combination of both. The term 'coupled' may refer to two or more elements that are in direct physical contact. However, 'coupled' may also refer to two or more elements that are not in direct contact with each other, but yet still cooperate or interact with each other.

Moreover, the pivot eyeglass frame may be substantially similar in form and profile to the foundation eyeglass frame. The pivot eyeglass frame may be configured to rotate about the pivot mechanism of the foundation eyeglass frame. The pivot mechanism, comprising of pivot elements and alignment elements, may facilitate the pivot eyeglass frame to incrementally rotate from an initial position that substantially overlaps a user's line of sight through to a subsequent position that represents a furthermost rotation of the pivot eyeglass frame relative to the foundation eyeglass frame. In some examples, the pivot mechanism may facilitate one or more intermediate orientations of the pivot eyeglass frame that lie between the above-referenced initial and subsequent positions.

In some examples, the foundation eyeglass frame may include a nose bridge that separates into two elements at a coupling point. The purpose of separating the nose bridge into two elements permits each half of the foundation eyeglass frame to fold into a separate, compact form. Further, the two elements of the nose bridge may be selectively coupled, and uncoupled, using magnets that are rigidly fixed to the free ends of each element at the coupling point.

Figure 1B:
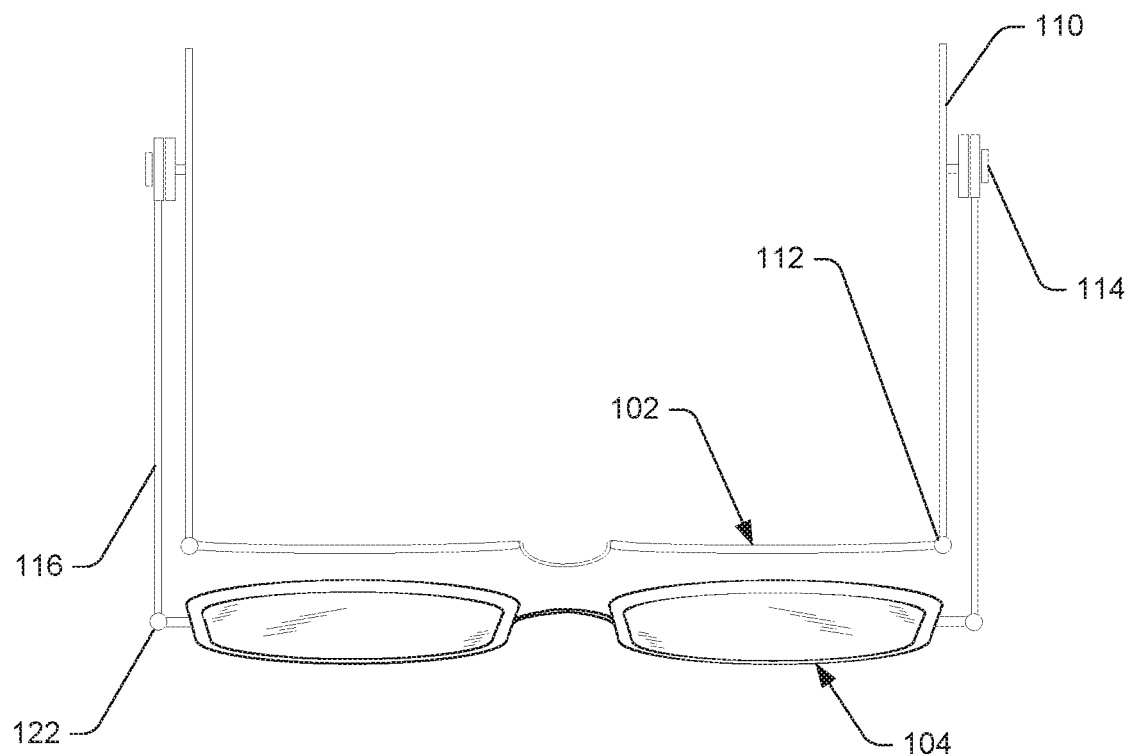

FIGS. 1A and 1B illustrate an exemplary embodiment of a pair of dual-frame eyeglasses 100. The dual-frame eyeglasses 100 may comprise of a foundation eyeglass frame 102 and a pivot eyeglass frame 104. The foundation eyeglass frame 102 may be configured to be worn directly on a user's head. In the illustrated example, the foundation eyeglass frame 102 may include a foundation-lens support frame 106 that comprises of a left and right portion, configured to selectively hold a pair of lenses in place in front of a user's line-of sight. In some examples, the foundation eyeglass frame 102 may be configured without a pair of eyeglass lenses installed. The purpose of doing so is to allow a user to selectively avoid seeing through lenses while wearing the pair of dual-frame eyeglasses 100. For example, a user may choose to see through lenses installed on the second, pivot eyeglass frame 104 by rotating the pivot eyeglass frame 104 in a downward direction, such that the lenses of the pivot eyeglass frame 104 are positioned in front of the user's line-of-sight. At a point in time when a user chooses not to see through the lenses, rather than having to remove the pair of dual-frame eyeglasses 100, the user may rotate the pivot eyeglass frame 104 in an upward direction, so that the lenses of the pivot eyeglass frame 104 no longer obstruct the user's line of sight.

The foundation eyeglass frame 102 may include a nose bridge 108 that is rigidly fixed to the left and right portions of the foundation-lens support frame 106. The nose bridge 108 may be formed to contour over a user's nose when the dual-frame eyeglasses 100 are worn on the user's head. The nose bridge 108 may further include a coupling mechanism that selectively couples and uncouples the nose bridge 108 into two elements. In turn, this may permit a left and right portion of the foundation eyeglass frame 102 to fold into separate, compact forms.

The foundation eyeglass frame 102 may further include a pair of temple arms 110. One end of each temple arm may be rigidly fixed to a left or right side of the foundation-lens support frame 106, via a hinge 112. Further, the opposing free end of each temple arm 110 may be bent to wrap around the back of a user's ear while the dual-frame eyeglasses are worn on the user's head.

In the illustrated example, a pair of pivot mechanisms 114 may be rigidly fixed to each temple arm 110. The pair of pivot mechanisms 114 may couple the foundation eyeglass frame 102 to the pivot eyeglass frame 104 and further permit the pivot eyeglass frame 104 to incrementally rotate from an initial position in front of a user's line of sight through to a subsequent position that is angularly offset above a user's line of sight. In some examples, the pair of pivot mechanisms 114 may facilitate one or more intermediate orientations of the pivot eyeglass frame 104 relative to the foundation eyeglass frame 102 that lie between the above-referenced initial and subsequent positions.

Moreover, the pivot eyeglass frame 104 may include a pivot-lens support frame 118 that comprises a left and right portion for holding a pair of lenses. The pair of lenses may include corrective lenses, protective lenses, sunglass lenses, or any other type of eyeglass lens. Further, the pivot eyeglass frame 104 may comprise of a pivot-frame nose bridge 120 that is rigidly fixed to a left and right portion of the pivot-lens support frame 118. One end of each pivot arm 116 may be rigidly fixed to a left or right side of the pivot-lens support frame 118, via a hinge 122. The opposing free end of each pivot arm 116 may be rigidly fixed to one of the pair of pivot mechanisms 114 that permit the pivot eyeglass frame 104 to rotate relative to the foundation eyeglass frame 102.

Figure 2A:
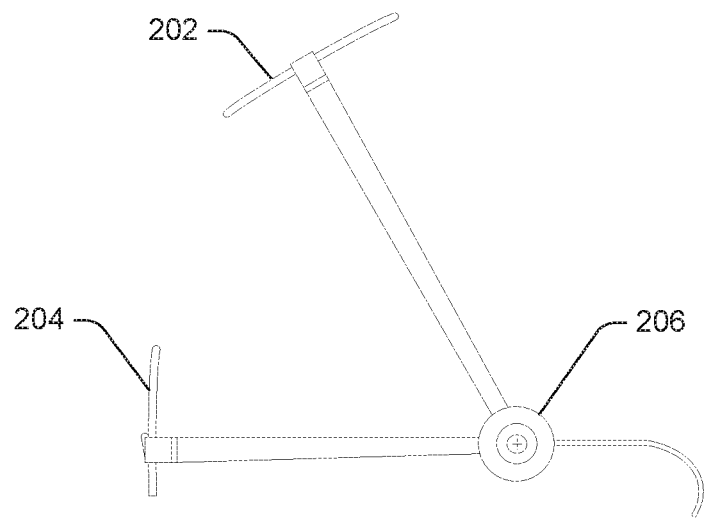
FIGS. 2A through to 2C illustrate an exemplary embodiment of the dual-frame eyeglasses, showing different angular orientations of a pivoting eyeglass frame relative to a foundation eyeglass frame.

FIGS. 2A through to 2C illustrate an exemplary embodiment of the dual-frame eyeglasses, showing different angular orientations of a pivot eyeglass frame 202 relative to a foundation eyeglass frame 204. The pivot eyeglass frame 202 and the foundation eyeglass frame 204 correspond to pivot eyeglass frame 104 and foundation eyeglass frame 102, respectively. Further, FIG. 2A illustrates a first configuration whereby the pivot eyeglass frame 202 is at a furthermost rotation away from a user's line of sight. A user may elect to move the pivot eyeglass frame 202 into the first configuration at a time when the user chooses not to see through the lenses of the pivot eyeglass frame 202 and would instead prefer to continue wearing the pair of dual-frame eyeglasses. The pivot eyeglass frame 202 may rotate about a pair of pivot points, defined by a pair of pivot mechanisms 206 that are rigidly fixed onto each temple arm of the foundation eyeglass frame 204. The pair of pivot mechanisms 206 may correspond to the pair of pivot mechanisms 114.

Figure 2B:
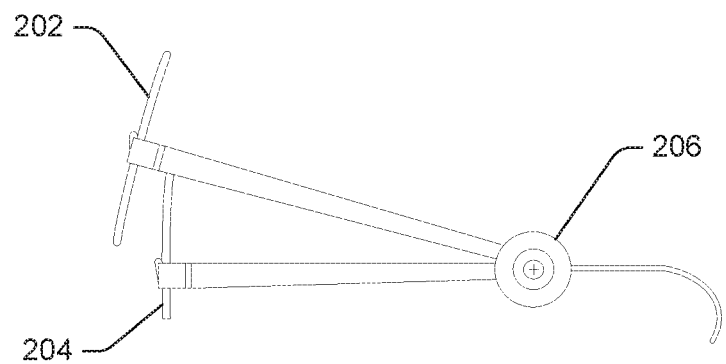
Figure 2C:
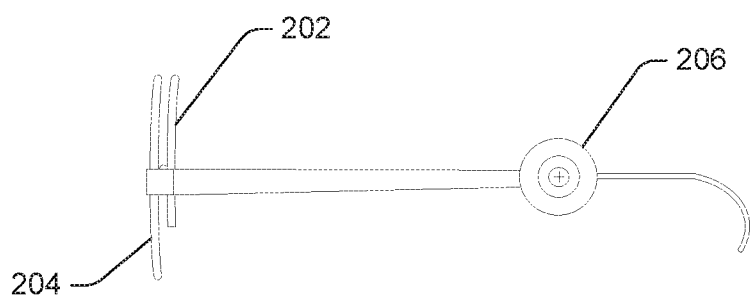

FIG. 2B illustrates a second configuration of the pivot eyeglass frame 202 relative to the foundation eyeglass frame 204. The pivot mechanism 206 may be configured to enable the pivot eyeglass frame 202 to selectively couple to the foundation eyeglass frame 204 at intermediate angular orientations that lie between the user's line of sight and the furthermost orientation shown in FIG. 2A. Further, FIG. 2C illustrates a third configuration of the pivot eyeglass frame 202 whereby the pivot eyeglass frame 202 substantially overlaps the foundation eyeglass frame 204, and the user's line of sight. A user may elect to move the pivot eyeglass frame 202 into the third configuration at a time when the user chooses to see through the lenses of the pivot eyeglass frame 202.

FIGS. 3A and 3B illustrate an exemplary embodiment of a pivot mechanism 302 for the dual-frame eyeglasses. Particularly, FIG. 3A illustrates a plan view of the pivot mechanism 302, and FIG. 3B illustrates an exploded view of the pivot mechanism 302 shown in FIG. 3A. In various examples, the pivot mechanism 302 may facilitate a coupling between the foundation eyeglass frame and the pivot eyeglass frame, while also allowing the pivot eyeglass frame to incrementally rotate between positions that substantially overlap a user's line of sight through to a furthermost rotation away from the user's line of sight.

Moreover, the pivot mechanism 302 may comprise of a base plate 304 that is rigidly fixed to a temple arm 306 of the foundation eyeglass frame, and a pivot plate 308 that is rigidly fixed to the pivot arm 310 of the pivot eyeglass frame. The base plate 304 and the pivot plate 308 may substantially abut one another to form the pivot mechanism 302. In an alternate configuration, the base plate 304 may be rigidly fixed to the pivot arm 310 of the pivot eyeglass frame, and the pivot plate 308 may be rigidly fixed to the temple arm 306 of the foundation eyeglass frame.

In the illustrated example, the base plate 304 may include a plurality of recess seats 312 etched into a mating surface 314 that abuts the pivot plate 308. Similarly, the pivot plate 308 may include a plurality of recess seats 316 etched into a mating surface 318 that abuts the base plate 304. Each of the recess seats 312 and 316 may receive a magnet that, in part, may facilitate a coupling between the base plate 304 and the pivot plate 308.

For example, magnets 320 may nest within the recess seats 312 of the base plate 304, and magnets 322 may nest within the recess seats 316 of the pivot plate 308. The magnets 320 of the base plate 304 may have a polarity that is substantially opposite to a polarity of the magnets 322 of the pivot plate 308. As a result, a magnetic force generated between magnets 320 and magnets 322 may selective couple the pivot plate 308 to the base plate 304.

In various examples, the recess seats 312 and 316 within each of the base plate 304 and the pivot plate 308 may be formed to a particular depth and cross-section that is substantially similar to an exterior profile of magnets 320 and 322 that are nested therein. Thus, the exposed surface of magnet 320 and 322 may be flush and coplanar with the mating surface 314 of the base plate 304 and the mating surface 318 of the pivot plate 308, respectively. This ensures that the presence of magnets 320 and 322 does not mechanically interfere with the rotation of pivot plate 308 relative to the base plate 304.

Furthermore, a fastener 324 may rigidly fix the base plate 304 and the pivot plate 308 to one another, through the rotational centroid of the pivot mechanism 302. The fastener 324 may comprise of a screw, bolt, lock-pin, or any other fastening system that facilitates rotation of the pivot plate 308 relative to the base plate 304 about an axis perpendicular to the adjoining pivot plate 308 and base plate 304, while also restricting translation of the pivot plate 308 relative to the base plate 304. In some examples, a fastener 324 may pass through a spacer 326 that is positioned between the base plate 304 and the pivot plate 308. The spacer 326 may be included as a sacrificial component to limit surface abrasion between the mating surface 314 of the base plate 304 and the mating surface 318 of the pivot plate 308.

Figure 4B:
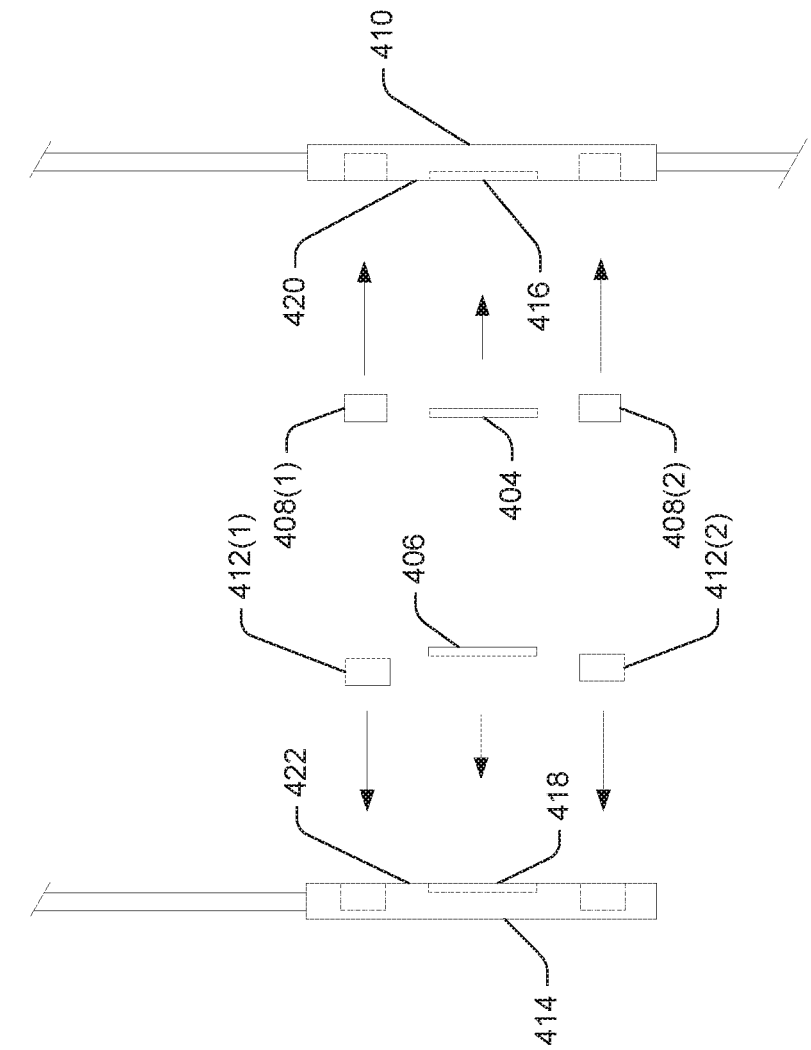
FIGS. 4A and 4B illustrate an exemplary embodiment of a pivot mechanism for the dual-frame eyeglasses. Particularly.
Figure 4A:
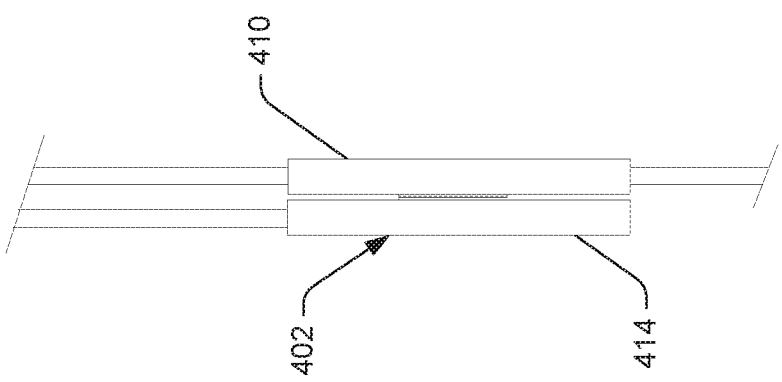

FIGS. 4A and 4B illustrate an exemplary embodiment of a pivot mechanism 402 for the dual-frame eyeglasses. Particularly, FIG. 4A illustrates a plan view of the pivot mechanism, and FIG. 4B illustrates an exploded view of the pivot mechanism 402 shown in FIG. 4A. In various examples, the pivot mechanism 402 is substantially similar to the pivot mechanism 302 of FIGS. 3A and 3B, but for the exclusion of fastener 324 and spacer 326, and the inclusion of pivot magnets 404 and 406 at a rotational axis of the pivot mechanism 402. The magnets 408 that nest within the base plate 410 may correspond to magnets 320, and the magnets 412 nested within the pivot plate 414 may correspond to magnets 322. Moreover, rather than having fastener 324 facilitate rotation of the pivot plate 308 relative to the base plate 304, as illustrated in FIGS. 3A and 3B, the pivot mechanism 402 may comprise of a pair of pivot magnets 404 and 406 that nest within a recess seat 416 of the base plate 410 and a recess seat 418 of the pivot plate 414, respectively. The pair of pivot magnets 404 and 406 may be positioned at the rotational centroid of the base plate 410 and pivot plate 414 respectively.

Furthermore, the pivot magnet 404 of the base plate 410 may have a polarity that is substantially opposite to a polarity of the pivot magnet 406 of the pivot plate 414. As a result, a magnetic force generated between the pivot magnet 404 and 406 may selectively couple and facilitate rotation of the pivot plate 414 relative to the base plate 410, while restricting translation of the pivot plate 414 relative to the base plate 410.

In some examples, the recess seat 416 within the base plate 410 that houses the pivot magnet 404 may be formed with a cross-section that is substantially similar to an exterior profile of the pivot magnet 404, and with a depth that is less than the thickness of the pivot magnet 404. Thus, the exposed surface of the pivot magnet 404 may be coplanar and proud of a mating surface 420. Similarly, the recess seat 418 within the pivot plate 414 that houses pivot magnet 406 may be formed with a cross-section that is substantially similar to an exterior profile of pivot magnet 406, and with a depth that is less than the thickness of the pivot magnet 406. Similar to the base plate 410 configuration, the exposed surface of pivot magnet 406 may be coplanar and proud of the mating surface 422. By configuring the pivot magnet 404 and 406 to nest proud of their respective mating surfaces 420 and 422, the mating surfaces 420 and 422 may not contact one another, while the pivot magnets 404 and 406 are selectively coupled. In other words, the pivot magnet 404 and 406 may limit abrasion between the mating surface 420 of the base plate 410 and the mating surface 422 of the pivot plate 414, while the pivot plate 414 rotates relative to the base plate 410.

Figure 5A:
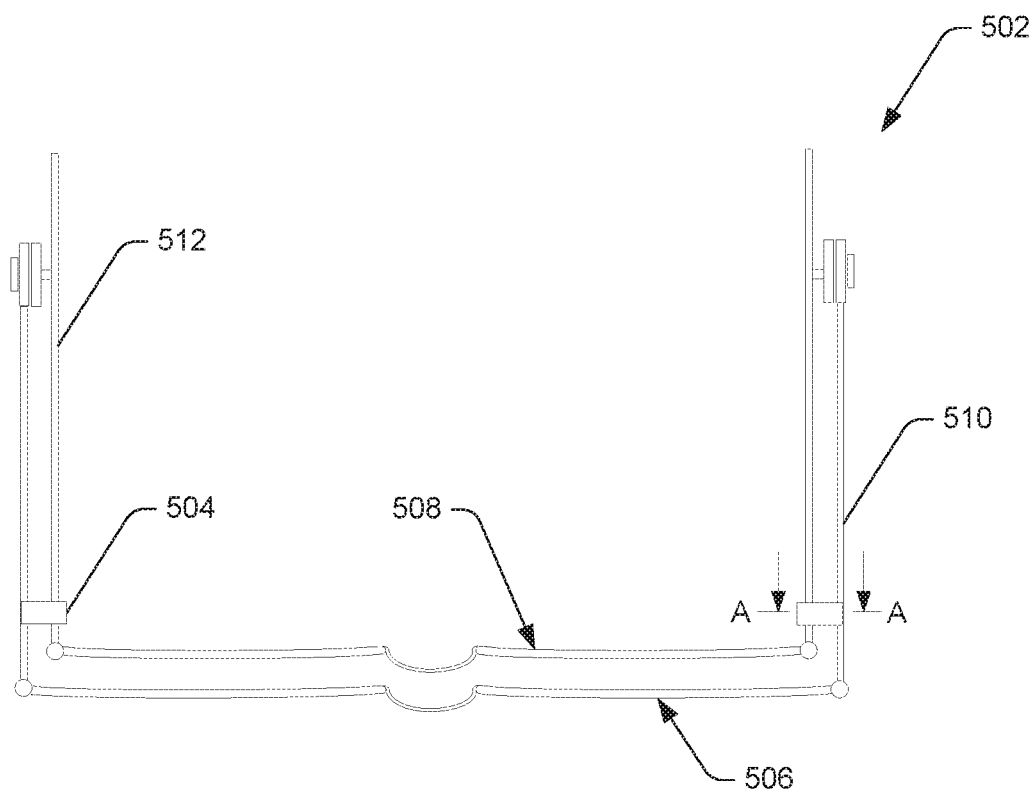
FIGS. 5A and 5B illustrate an exemplary pair of arm catches that limit rotation of the pivot eyeglass frame relative to the foundation eyeglass frame.

FIG. 5A illustrates a plan view of a pair of the dual frame eyeglasses 502, showing a pair of arm catches 504 that limits a rotation of the pivot eyeglass frame 506 relative to a foundation eyeglass frame 508. Each of the arm catches 504 may provide a mechanical stop that limits rotation of each pivot arm 510 of the pivot eyeglass frame 506 relative to an intersecting temple arm 512 of the foundation eyeglass frame 508. In other words, each of the arm catches 504 may help prevent the pivot eyeglass frame 506 from rotating below the line of sight of the user. It is noteworthy that the line of the sign of the user may be defined by an orientation of the user relative to the foundation eyeglass frame 508.

Figure 5B:
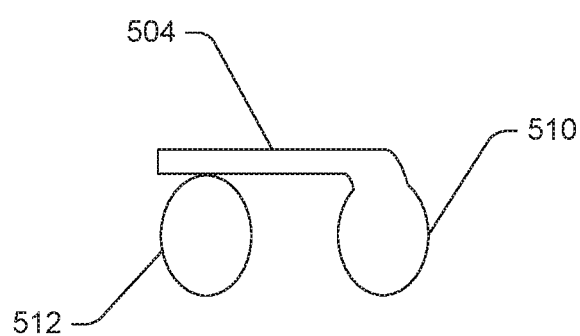

FIG. 5B illustrates a cross-sectional view through Section A-A of FIG. 5A. In the illustrated example, the pair of arm catches 504 are integrated into each pivot arm 510 of the pivot eyeglass frame 506. In other examples, the pair of arm catches 504 may be rigidly fixed to the temple arm 512 of the foundation eyeglass frame 508.

FIG. 6A illustrates an exemplary pivot mechanism, comprising a pivot plate 602 with a rotational stop 604 and a base plate 606 with a recess seat 608. In this example, the pivot plate 602 and the base plate 606 may cooperatively limit rotation of the pivot eyeglass frame relative to the foundation eyeglass frame, based on an interaction between the rotational stop 604 and the recess seat 608.

In the illustrated example, the rotational stop 604 may comprise of a protrusion that projects from the pivot plate 602 towards the recess seat 608 of the base plate 606. In some examples, the rotational stop 604 may be an integral part of the pivot plate 602. In other examples, the rotational stop 604 may be a separate component that is rigidly fixed onto a mating surface 610 of the pivot plate 602. The mating surface 610 of the pivot plate 602 describes the surface of the pivot plate 602 that substantially abuts a corresponding, mating surface 612 of the base plate 606.

The recess seat 608 of the base plate 606 may be etched into the mating surface 612 of the base plate 606 at a predetermined depth that is substantially sufficient to receive a portion of the rotational stop 604 of the pivot plate 602. The profile of the recess seat 608 is intended to constrain rotation of the pivot plate 602 relative to the base plate 606 based on the rotational travel of the rotational stop 604. For example, the pivot plate 602 may rotate freely relative to the base plate 606, provided the rotational stop 604 of the pivot plate 602 is within the boundary edges of the recess seat 608 the base plate 606. When the rotational stop 604 abuts a boundary edge of the recess seat 608, the pivot plate 602 is constrained from further rotation.

FIGS. 6A and 6B illustrate an assembly of the pivot mechanism, whereby at least a portion of the rotational stop 604 of the pivot plate 602 extends into the recess seat 608 of the base plate 606. The pivot plate 602 may rotate freely relative to the base plate 606, and is only constrained when the rotational stop 604 abuts a boundary edge of the recess seat 608. In the illustrated example, the rotational stop 604 is an integral part of the pivot plate 602, and the recess seat 608 is an integral part of the base plate 606. In other examples, the rotational stop 604 may be an integral part of the base plate 606, or rigidly fixed to the base plate 606, and the recess seat 608 may be an integral part of the pivot plate 602.

Figure 6C:
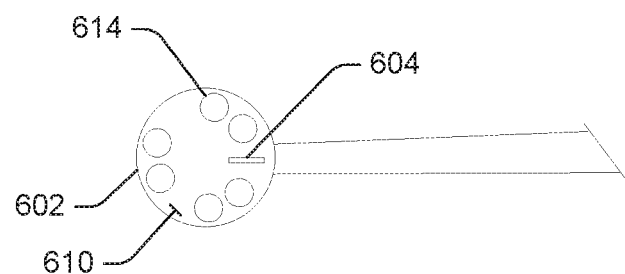
FIG. 6C illustrates a view through View A of FIG. 6B.
Figure 6D:
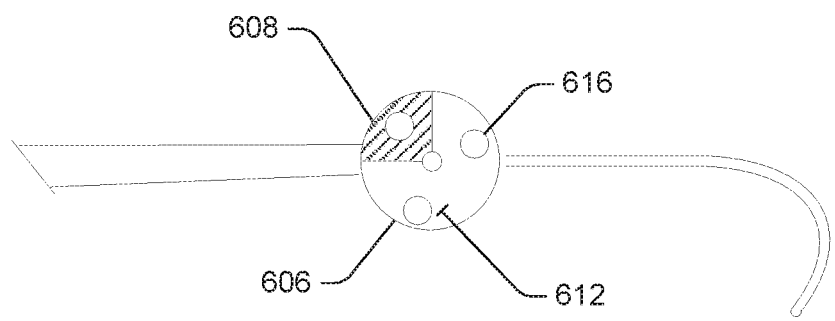
FIG. 6D illustrates a view through View B of FIG. 6B.

FIG. 6C illustrates a view through View A of FIG. 6B showing a pivot plate 602 of the pivot mechanism, with a plurality of magnets 614 in situ, and a rotational stop 604. In the illustrated example, the pivot plate 602 includes three grouped pairs of magnets 614, six magnets in total. In other examples, the pivot plate 602 may include any number of magnets 614 spaced circumferentially on the mating surface 610 of the pivot plate 602. FIG. 6D illustrates a view through View B of FIG. 6B showing a base plate 606 of the pivot mechanism, with three magnets 616 insitu, and a recess seat 608. In the illustrated example, the profile of the recess seat 608 is substantially equivalent to one quadrant of the base plate 606. Thus, an interfacing, pivot plate 602 may rotate freely relative to the base plate 606 provided the rotational stop 604 of the pivot plate 602 remains within the boundary edges of the recess seat 608 quadrant. In other examples, the profile of the recess seat 608 may envelope any portion of the base plate 606 that is equivalent to the intended rotational travel of the pivot eyeglass frame relative to the foundation eyeglass frame.

In various examples, the pivot plate 602 may include twice the number of magnets as the base plate 606. This may help improve the selective coupling of the pivot plate 602 to the base plate 606. Alternatively, the base plate 606 may include twice the number magnets relative the pivot plate 602, for purposes of the same rationale. In other examples, the base plate 606 and the pivot plate 602 may have the same number of magnets. Alternatively, or additionally, the pivot plate 602 may have different sized magnets or magnets of different strength relative to the base plate 606 magnets.

Figure 7A:
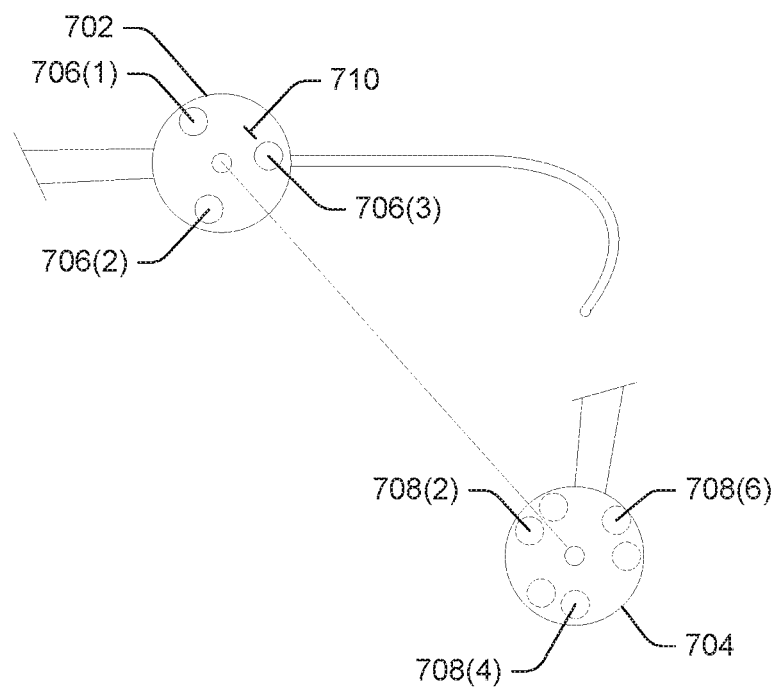
FIGS. 7A and 7B illustrates an exploded isometric view of a pivot mechanism of the dual-frame eyeglasses.
Figure 7B:
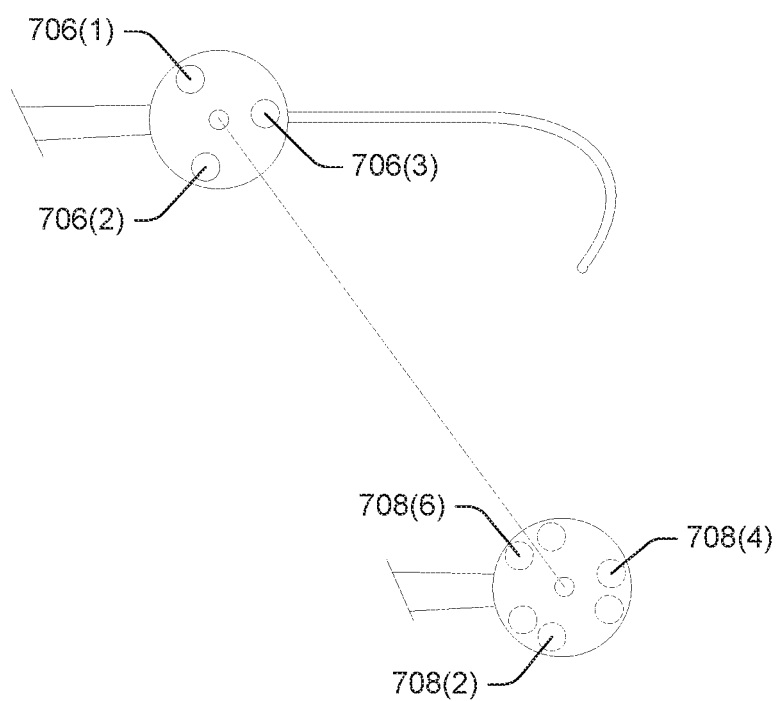

FIGS. 7A and 7B illustrates an exploded isometric view of a pivot mechanism for the dual-frame eyeglasses. FIG. 7A illustrates a first configuration of the pivot mechanism, whereby the pivot eyeglass frame rotates upward away from a user's line of sight. In the illustrated example, the pivot mechanism may comprise of a base plate 702 and a pivot plate 704. The base plate 702 may include magnets 706(1)-706(3) in situ that abut a corresponding mating surface of the pivot plate 704. It is noteworthy that the illustrated example displays three magnets. However, the base plate 702 may include any number of magnets. Similarly, the pivot plate 704 may include magnets 708(1)-708(4) in situ that abut a mating surface 710 of the base plate 702. It is noteworthy that the spacing of magnets 706(1)-706(3) on the base plate 702 are equidistant and substantially similar to the spacing of the grouped pair of magnets 708(1)-708(6) on the pivot plate 704. In turn, magnets 706(1)-706(3) may substantially overlap the grouped pair of magnets 708(1)-708(6), when the base plate 702 abuts the pivot plate 704, and also when the pivot plate 704 rotates relative to the base plate 702. Magnets 706(1)-706(3) may have a polarity that is substantially opposite to a polarity of magnets 708(1)-708(6). As a result, the opposing polarities may generate a magnetic force that attracts magnets 706(1)-706(3) to magnets 708(1)-708(6), causing a selective coupling of the base plate 702 and the pivot plate 704.

The first configuration illustrates an alignment and selective coupling of magnets 706(1)-706(3) on the base plate 702 and magnets 708(1)-708(6) on the pivot plate 704. In this configuration, the pivot plate 704 rotates the pivot arm 712 in an upward direction, which moves the pivot eyeglass frame away from a user's line of sight. For example, magnet 706(1) of the base plate 702 aligns with the grouped pair of magnets 708(1) and 708(2) of the pivot plate 704, magnet 706(2) of the base plate 702 aligns with the grouped pair of magnets 708(3) and 708(4) of the pivot plate 704, and so forth.

FIG. 7B illustrates a second configuration of the pivot mechanism, whereby the pivot plate 704 rotates the pivot arm 712 in a downward direction, which aligns the pivot eyeglass frame with a user's line of sight. For example, magnet 706(1) of the base plate 702 aligns with the grouped pair of magnets 708(5) and 708(6) of the pivot plate 704, magnet 706(2) of the base plate 702 aligns with the grouped pair of magnets 708(1) and 708(2) of the pivot plate 704, and so forth.

Figure 8A:
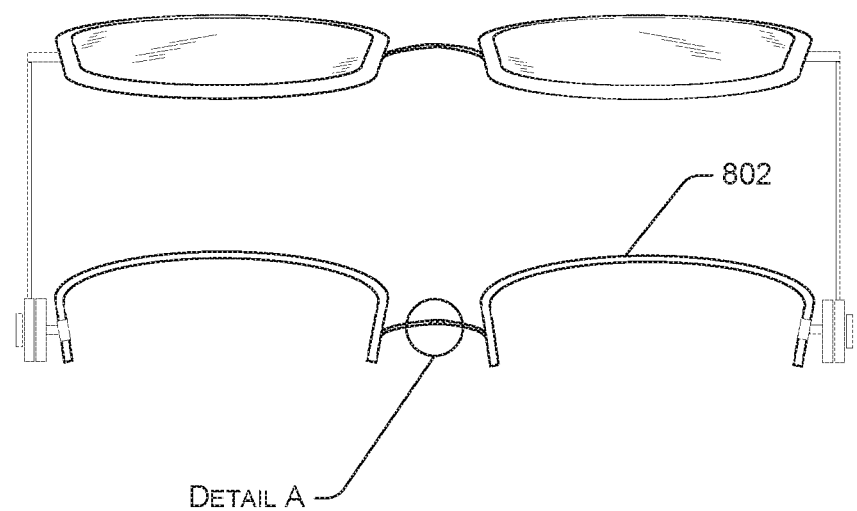
FIGS. 8A and 8B illustrate a view of a pair of dual-frame eyeglass, highlighting a magnetic coupling at a nose bridge of the foundation eyeglass frame.
Figure 8B:
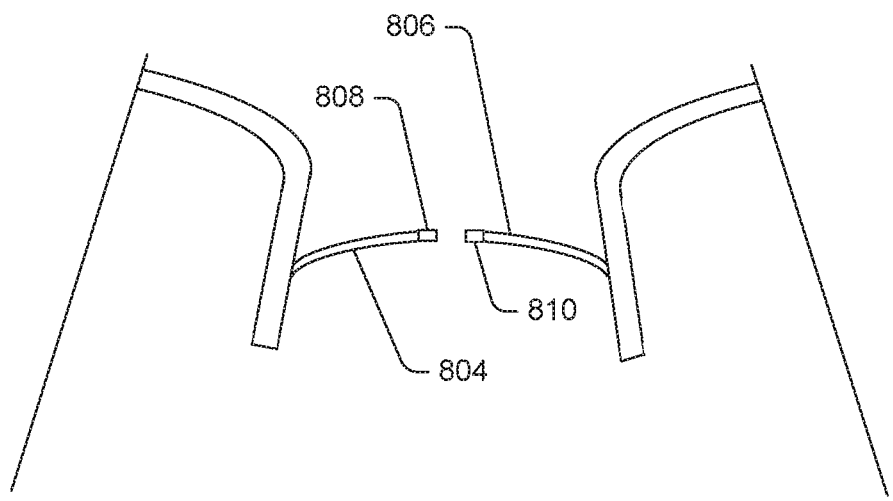

FIG. 8A illustrates a front view of a pair of dual-frame eyeglass that highlights a magnetic coupling at a nose bridge of the foundation eyeglass frame 802. FIG. 8B illustrates a detail view at Detail A of FIG. 8A, highlighting the magnetic coupling at the nose bridge.

In the illustrated example, the foundation eyeglass frame 802 may include a nose bridge that separates into two elements 804 and 806 at a coupling point. The purpose of doing may allow each half of the foundation eyeglass frame 802 to fold into a separate, compact form, as further described in FIG. 9. In some examples, each of the two elements 804 and 806 of the nose bridge may each have a length that is equivalent to substantially one half of the nose bridge. In other examples, the coupling point may be offset to one side of the nose bridge, such that the length of one element is more than one half of the total length of the nose bridge.

Further, the two elements 804 and 806 of the nose bridge may selectively couple, and uncouple from one another using magnets 808 and 810 that are rigidly fixed to the free ends of each element 804 and 806, respectively. For example, a first magnet 808 may be rigidly fixed to the free end of the first element 804 of the nose bridge, and a second magnet 810 may be rigidly fixed to the free end of the second element 806 of the nose bridge. Further, the first magnet 808 may have a polarity that is substantially opposite to a polarity of the second magnet 810. As a result, the opposing polarities may generate a magnetic force that attracts the first magnet 808 to the second magnet 810, causing a selective coupling of the two elements 804 and 806 of the nose bridge.

Figure 9A:
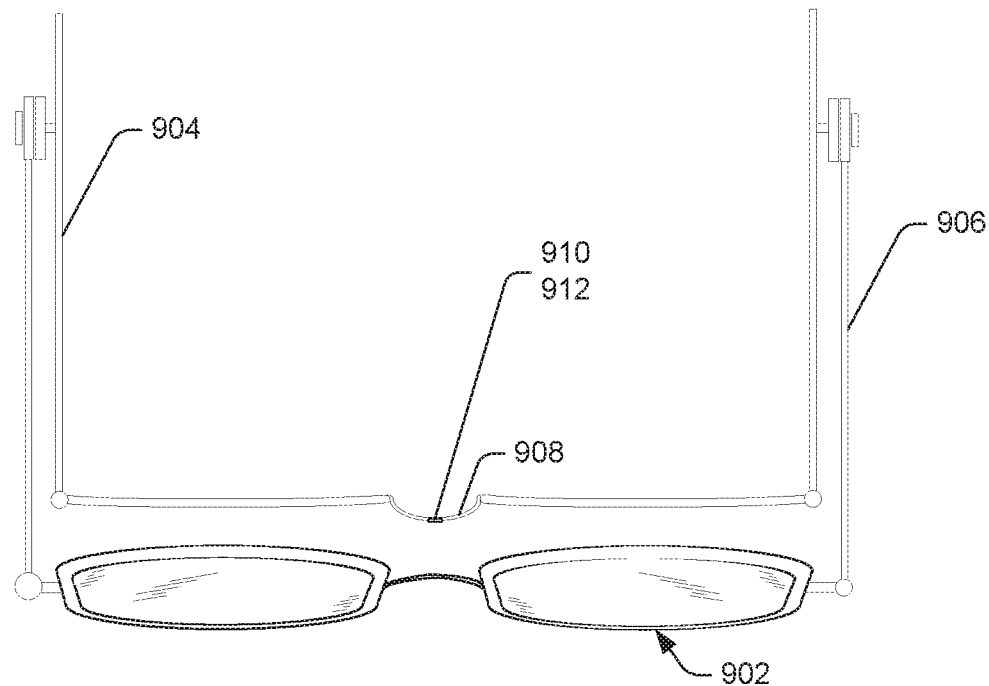
FIGS. 9A and 9B illustrate an exemplary pair of dual-frame eyeglasses in a first and second configuration.
Figure 9B:
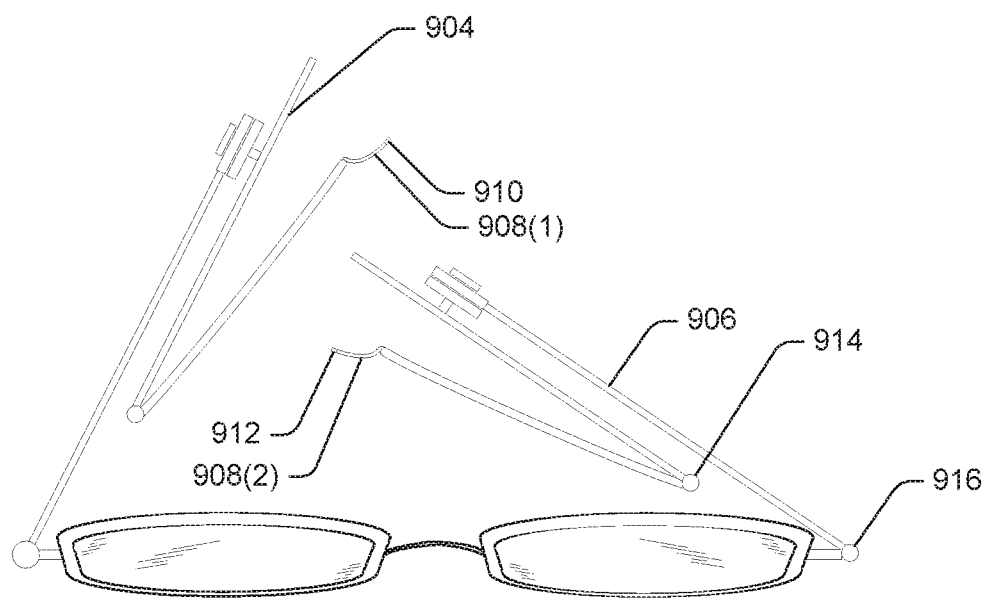

FIGS. 9A and 9B illustrate an exemplary pair of dual-frame eyeglasses 902 in a first and second configuration. FIG. 9A illustrates a first configuration of the pair of dual-frame eyeglasses 902 that are unfolded for use. In this example, a nose bridge 908 of the foundation eyeglass frame 904 may comprise of two elements that are selectively coupled to one another by the interaction of a first magnet 910 and a second magnet 912 at a coupling point. That is, the first magnet 910 and the second magnet 912 may be rigidly fixed to the free ends of each element of the nose bridge 908, respectively. Further, the magnetic force generated between the first magnet 910 and the second magnet 912 may selectively couple the two elements to one another.

FIG. 9B illustrates a second configuration of the pair of dual-frame eyeglasses 902, whereby the two elements of the nose bridge 908 are selectively uncoupled, allowing the pair of dual-frame eyeglasses 902 to fold into a more compact form relative to the first configuration shown in FIG. 9A. The first magnet 910 and the second magnet 912 of the nose bridge 908 may be uncoupled by applying a physical force that greater than the magnetic force generated by the first magnet 910 and the second magnet 912. Once the two elements of the nose bridge 908 are uncoupled, the foundation eyeglass frame 904 may fold into a compact form via rotation about hinges 914 and 916.

Figure 10A:
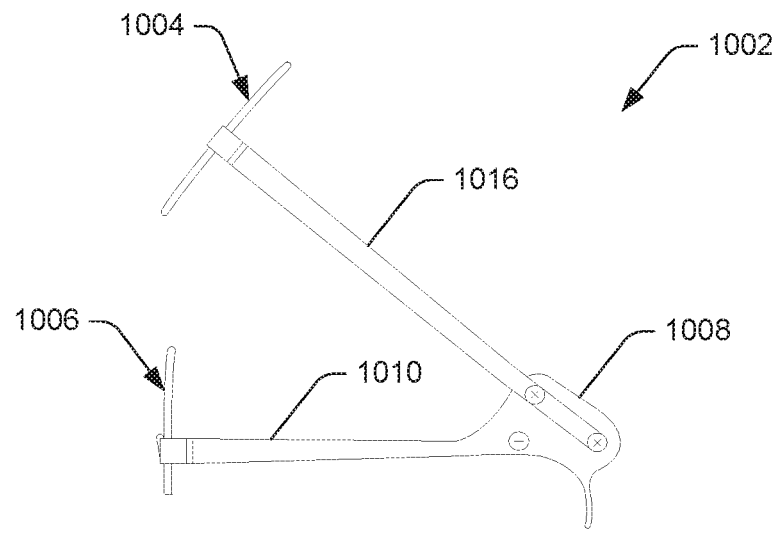
FIGS. 10A through to 10D illustrate an exemplary embodiment of a pair of dual-frame eyeglasses, comprising a pivot eyeglass frame that rotates about a pair of pivot points on a foundation eyeglass frame.
Figure 10B:
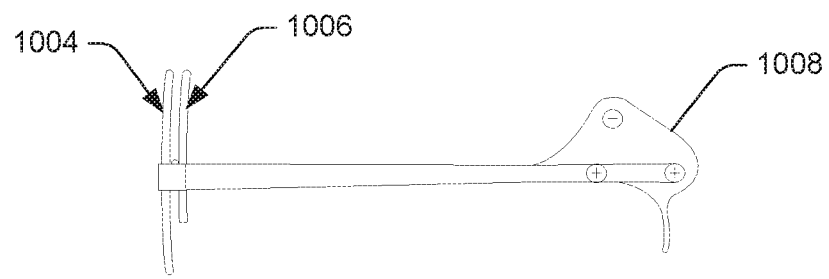
FIG. 10B illustrates an orientation of the pivot eyeglass frame that substantially overlaps the foundation eyeglass frame.

FIGS. 10A through to 10D illustrate an exemplary embodiment of a pair of dual-frame eyeglasses 1002, comprising a pivot eyeglass frame 1004 that rotates about a pair of pivot points on a foundation eyeglass frame 1006. In this example, the pivot points are located on a base plate 1008 that is integrated into each temple arm 1010 of the foundation eyeglass frame 1006. The base plate 1008 may be sized to include the pivot element 1012 and alignment elements 1014(2) and 1014(1). The pivot element 1012 may facilitate rotation of the pivot arm 1016 of the pivot eyeglass frame 1004 relative to the temple arm 1010 of the foundation eyeglass frame 1006, while the alignment elements 1014(2) and 1014(1) may help selectively couple the pivot eyeglass frame 1004 in one or more orientation(s) relative to the foundation eyeglass frame 1006. FIG. 10A illustrates a furthermost rotation of the pivot eyeglass frame 1004 relative to the foundation eyeglass frame 1006, while FIG. 10B illustrates an orientation of the pivot eyeglass frame 1004 that substantially overlaps the foundation eyeglass frame 1006.

Figure 10C:
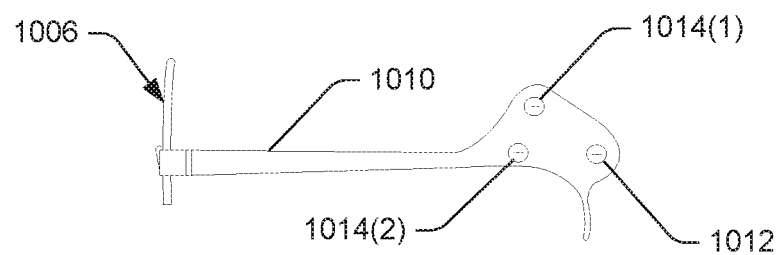
FIG. 10C illustrates an exemplary embodiment of the foundation eyeglass frame as depicted in FIGS. 10A and 10B.

FIG. 10C illustrates an exemplary embodiment of the foundation eyeglass frame 1006. The foundation eyeglass frame 1006 may include a base plate 1008 that is integrated into each temple arm 1010. Each base plate 1008 may be sized to include a pivot element 1012, at the pivot point, and alignment elements 1014(2) and 1014(1). The alignment elements 1014(2) and 1014(1) may help selectively couple the pivot eyeglass frame 1004 in one of two orientations relative to the foundation eyeglass frame 1006. For example, when alignment element 1014(1) and pivot element 1012 of the foundation eyeglass frame 1006 selectively couple to the alignment element 1018 and pivot element 1020 of the pivot eyeglass frame 1004 respectively, the pivot eyeglass frame 1004 may be at its furthermost rotation relative to the foundation eyeglass frame 1006. Additionally, when alignment element 1014(2) and pivot element 1012 of the foundation eyeglass frame 1006 selectively couple to the alignment element 1018 and pivot element 1020 of the pivot eyeglass frame 1004 respectively, the pivot eyeglass frame 1004 may substantially overlap the foundation eyeglass frame 1006, and the user's line of sight.

It is noteworthy that one or more additional alignment elements may be spaced between alignment element 1014(2) and 1014(1) on the base plate 1008 to enable intermediate angular orientations of the pivot eyeglass frame 1004 relative to the foundation eyeglass frame 1006.

In the illustrated example, the pivot element 1012 and the alignment element 1014(2) and 1014(1) may comprise of magnets that nest within recess seats of the base plate 1008. In other examples, the pivot element 1012 may comprise of any other fastening system that facilitates rotation about an axis perpendicular to adjoining surfaces, such as a screw, bolt, or lock-pin fastening system. Additionally, the alignment element 1014(2) and 1014(1) may comprise of any fastening system that restricts translation between adjoining surfaces, such as a screw, bolt, lock-pin, or a VELCRO (Registered trademark) fastening system.

Figure 10D:
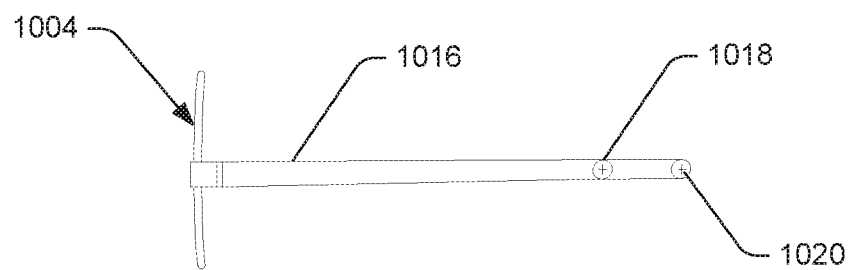
FIG. 10D illustrates an exemplary embodiment of the pivot eyeglass frame as depicted in FIGS. 10A and 10B.

FIG. 10D illustrates an exemplary embodiment of the pivot eyeglass frame 1004 as depicted in FIGS. 10A and 10B. The pivot eyeglass frame 1004 may include a pivot element 1020 and an alignment element 1018 on each pivot arm 1016. The pivot element 1020 may be located substantially near the free end of each pivot arm 1016. Further, the alignment element 1018 may be offset from the pivot element 1020 by a distance that is substantially similar to the offset between the alignment elements 1014(2) or 1014(1) and the pivot element 1012 of the foundation eyeglass frame 1006. In doing so, the alignment element 1018 on each pivot arm 1016 may overlap and selectively couple to one of the alignment elements 1014(2) or 1014(1) while the pivot elements 1012 and 1020 are coupled.

In the illustrated example, the pivot element 1020 and the alignment element 1018 of the pivot eyeglass frame 1004 are magnets that nest within recess seats of the pivot arm 1016. The pivot element 1020 magnet may have a polarity that is substantially opposite to the polarity of the pivot element 1012 magnet of the foundation eyeglass frame 1006. As a result, a magnetic force generated between the pair of pivot elements 1012 and 1020 magnets may facilitate rotation of the pivot eyeglass frame 1004 relative to the foundation eyeglass frame 1006. Additionally, the alignment element 1018 magnet of the pivot eyeglass frame 1004 may have a polarity that is substantially opposite to the polarity of the alignment element 1014(2) and 1014(1) magnets of the foundation eyeglass frame 1006. Similarly, a magnetic force generated between the alignment element 1018 magnet and the alignment element 1014(2) or 1104(2) magnet may selectively couple an orientation of the pivot eyeglass frame 1004 to the foundation eyeglass frame 1006.

Furthermore, the pivot element 1020 of the pivot eyeglass frame 1004 may comprise of any fastening system that facilitates rotation about an axis perpendicular to adjoining surfaces, such as a screw, bolt, or lock-pin fastening system. Additionally, the alignment element 1018 of the pivot eyeglass frame 1004 may comprise of any fastening system that restricts translation between adjoining surfaces, such as a screw, bolt, lock-pin, or VELCRO (Registered trademark) fastening system.

Figure 11A:
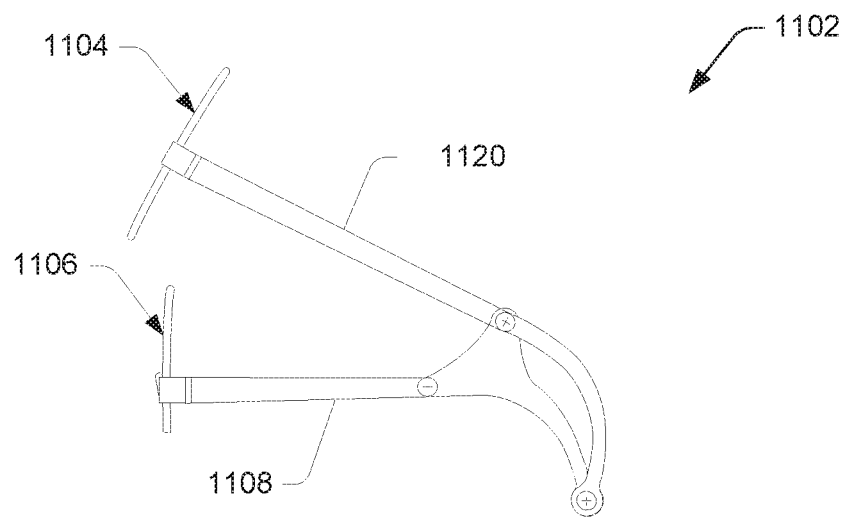
FIGS. 11A through to 11D illustrate an exemplary embodiment of a pair of dual-frame eyeglasses, comprising a pivot eyeglass frame that rotates about a pair of pivot points on a foundation eyeglass frame.
Figure 11B:
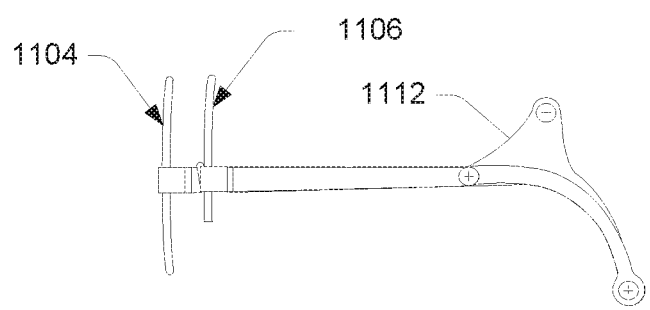
FIG. 11B illustrates an orientation of the pivot eyeglass frame that substantially overlaps the foundation eyeglass frame.

FIGS. 11A through to 11D illustrate an exemplary embodiment of a pair of dual-frame eyeglasses 1102, comprising a pivot eyeglass frame 1104 that rotates about a pair of pivot points on a foundation eyeglass frame 1106. In this example, the pivot points may be located substantially near the free end of each temple arm 1108 of the foundation eyeglass frame 1106. FIG. 11A illustrates a furthermost rotation of the pivot eyeglass frame 1104 relative to the foundation eyeglass frame 1106, while FIG. 11B illustrates an orientation of the pivot eyeglass frame 1104 that substantially overlaps the foundation eyeglass frame 1106.

Figure 11C:
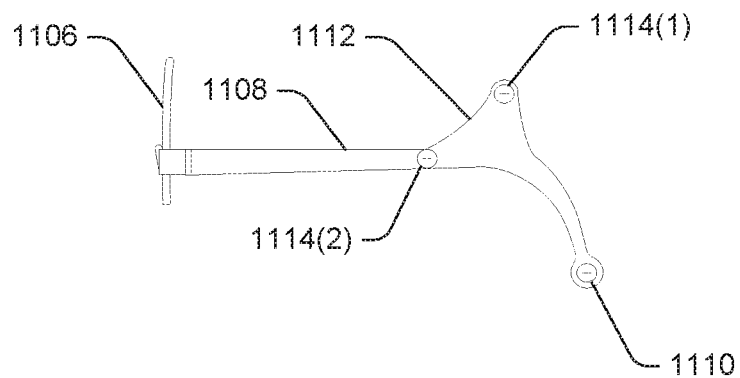
FIG. 11C illustrates an exemplary embodiment of the foundation eyeglass frame as depicted in FIGS. 11A and 11B.

FIG. 11C illustrates an exemplary embodiment of the foundation eyeglass frame 1106. The foundation eyeglass frame 1106 may include a pivot element 1110 at the pivot point on each temple arm 1108. Further, a fingerlike protrusion 1112 may be integrated into each temple arm 1108. Each fingerlike protrusion 1112 may be sized to include an alignment element 1114(1) that helps selectively couple the pivot eyeglass frame 1104 in a furthermost rotation relative to the foundation eyeglass frame 1106. In other words, when the alignment element 1114(1) and pivot element 1110 of the foundation eyeglass frame 1106 selectively couple to the alignment element 1116 and pivot element 1118 of the pivot eyeglass frame 1104 respectively, the pivot eyeglass frame 1104 may be at its furthermost rotation relative the foundation eyeglass frame 1106.

Additionally, the foundation eyeglass frame 1106 may include another alignment element 1114(2) that is positioned along the longitudinal axis of the temple arm 1108. The alignment element 1114(2) may enable the pivot eyeglass frame 1104 to selectively couple to the foundation eyeglass frame 1106 in an orientation that substantially overlaps the foundation eyeglass frame 1106. In other words, when the alignment element 1114(2) and pivot element 1110 of the foundation eyeglass frame 1106 selectively couple to the alignment element 1116 and pivot element 1118 of the pivot eyeglass frame 1104 respectively, the pivot eyeglass frame 1104 may substantially overlap the foundation eyeglass frame 1106, and the user's line of sight.

It is noteworthy that one or more additional alignment elements may be spaced between alignment element 1114(1) and 1114(2) to enable intermediate angular orientations of the pivot eyeglass frame 1104 relative to the foundation eyeglass frame 1106.

In the illustrated example, the pivot element 1110 and the alignment element 1114(1) and 1114(2) of the foundation eyeglass frame 1106 may comprise of magnets that nest within recess seats of the temple arm 1108 and the fingerlike protrusion 1112. In other examples, the pivot element 1110 may comprise of any other fastening system that facilitates rotation about an axis perpendicular to adjoining surfaces, such as a screw, bolt, or lock-pin fastening system. Additionally, the alignment elements 1114(1) and 1114(2) may comprise of any fastening system that restricts translation between adjoining surfaces, such as a screw, bolt, lock-pin, or a VELCRO (Registered trademark) fastening system.

Figure 11D:
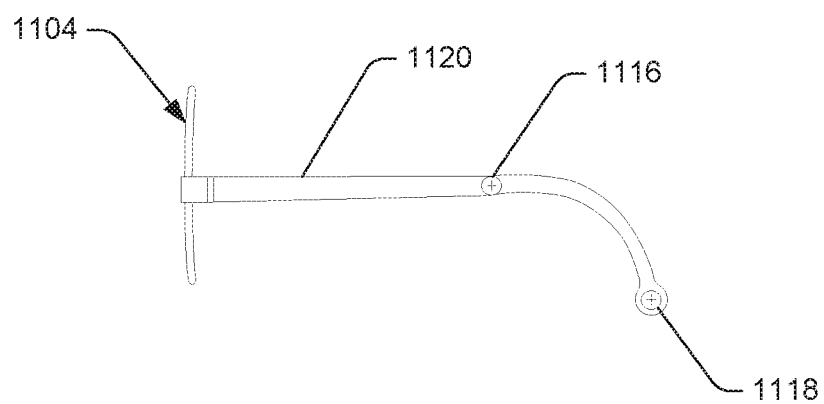
FIG. 11D illustrates an exemplary embodiment of the pivot eyeglass frame as depicted in FIGS. 11A and 11B.

FIG. 11D illustrates an exemplary embodiment of the pivot eyeglass frame 1104 as depicted in FIGS. 11A and 11B. The pivot eyeglass frame 1104 may include the pivot element 1118 and the alignment element 1116 on each pivot arm 1120. The pivot element 1118 may be located substantially near the free end of each pivot arm 1120. Further, the alignment element 1116 may be offset from the pivot element 1118 by a distance that is substantially similar to the offset between the alignment elements 1114(1) or 1114(2) and the pivot element 1110 of the foundation eyeglass frame 1106. In doing so, the alignment element 1116 on each pivot arm 1120 may overlap and selectively couple to one of the alignment elements 1114(1) or 1114(2) while the pivot elements 1110 and 1118 are coupled.

In the illustrated example, the pivot element 1118 and the alignment element 1116 of the pivot eyeglass frame 1104 are magnets that nest within recess seats of each pivot arm 1120. The pivot element 1118 magnet may have a polarity that is substantially opposite to the polarity of the pivot element 1110 magnet of the foundation eyeglass frame 1106. As a result, a magnetic force generated between the pair of pivot element 1110 and 1118 magnets may facilitate rotation of the pivot eyeglass frame 1104 relative to the foundation eyeglass frame 1106. Additionally, the alignment element 1116 magnet of the pivot eyeglass frame 1104 may have a polarity that is substantially opposite to the polarity of the alignment element 1114(1) and 1114(2) magnets of the foundation eyeglass frame 1106. Similarly, a magnetic force generated between the alignment element 1116 magnet and the alignment element 1114(1) or 1114(2) magnets may selectively couple an orientation of the pivot eyeglass frame 1104 to the foundation eyeglass frame 1106.

Furthermore, the pivot element 1118 of the pivot eyeglass frame 1104 may comprise of any fastening system that facilitates rotation about an axis perpendicular to adjoining surfaces, such as a screw, bolt, or lock-pin fastening system. Additionally, the alignment element 1116 of the pivot eyeglass frame 1104 may comprise of any fastening system that restricts translation between adjoining surfaces, such as a screw, bolt, lock-pin, or VELCRO (Registered trademark) fastening system.

Figure 12A:
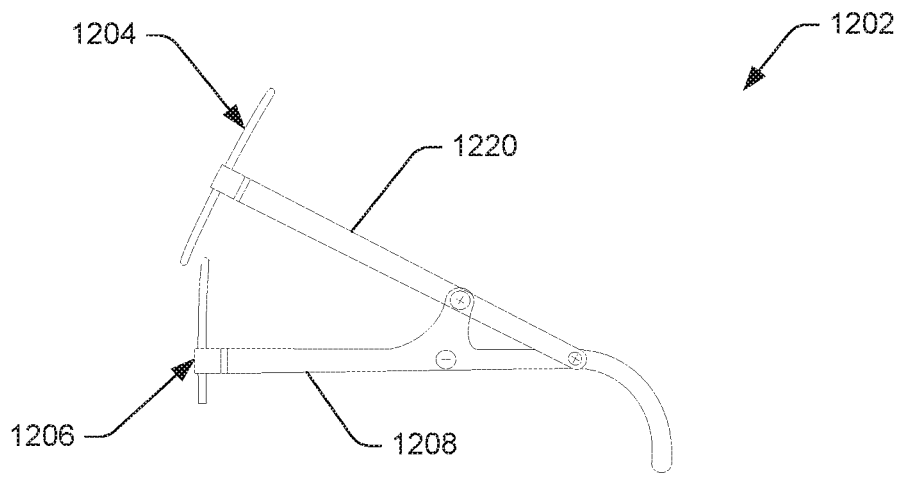
FIGS. 12A through to 12D illustrate an exemplary embodiment of a pair of dual-frame eyeglasses, comprising a pivot eyeglass frame that rotates about a pair of pivot points on a foundation eyeglass frame.

FIGS. 12A through to 12D illustrate an exemplary embodiment of a pair of dual-frame eyeglasses 1202, comprising a pivot eyeglass frame 1204 that rotates about a pair of pivot points on a foundation eyeglass frame 1206. In this example, the pivot points may be located on the temple arm 1208 of the foundation eyeglass frame 1206. More specifically, the pivot points may be located forward of the bend in the temple arm 1208 that is intended to wrap behind a user's ear. FIG. 12A illustrates a furthermost rotation of the pivot eyeglass frame 1204 relative to the foundation eyeglass frame 1206, while FIG. 12B illustrates an orientation of the pivot eyeglass frame 1204 that substantially overlaps the foundation eyeglass frame 1206.

Figure 12B:
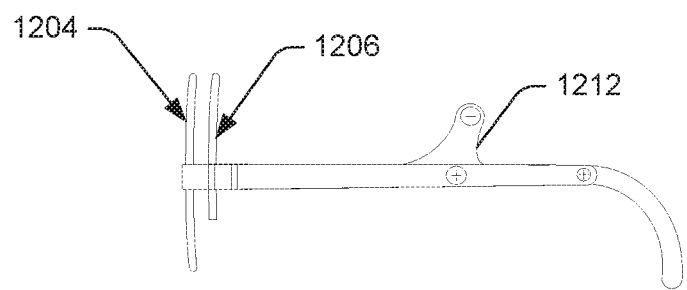
FIG. 12B illustrates an orientation of the pivot eyeglass frame that substantially overlaps the foundation eyeglass frame.
Figure 12C:
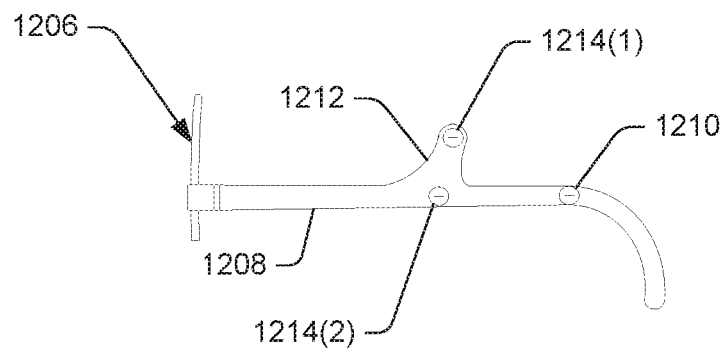
FIG. 12C illustrates an exemplary embodiment of the foundation eyeglass frame as depicted in FIGS. 12A and 12B.

FIG. 12C illustrates an exemplary embodiment of the foundation eyeglass frame 1206 as depicted in FIGS. 12A and 12B. The foundation eyeglass frame 1206 may include a pivot element 1210 at the pivot point on each temple arm 1208. Further, a fingerlike protrusion 1212 may be integrated into each temple arm 1208. Each fingerlike protrusion 1212 may be sized to include an alignment element 1214(1) that helps selectively couple the pivot eyeglass frame 1204 in a furthermost rotation relative to the foundation eyeglass frame 1206. In other words, when the alignment element 1214(1) and pivot element 1210 of the foundation eyeglass frame 1206 selectively couple to the alignment element 1216 and pivot element 1218 of the pivot eyeglass frame 1204 respectively, the pivot eyeglass frame 1204 may be at its furthermost rotation relative to the foundation eyeglass frame 1206.

Additionally, the foundation eyeglass frame 1206 may include another alignment element 1214(2) that is positioned along the longitudinal axis of the temple arm 1208. The alignment element 1214(2) may enable the pivot eyeglass frame 1204 to selectively couple to the foundation eyeglass frame 1206 in an orientation that substantially overlaps the foundation eyeglass frame 1206. In other words, when the alignment element 1214(2) and pivot element 1210 of the foundation eyeglass frame 1206 selectively couple to the alignment element 1216 and pivot element 1218 of the pivot eyeglass frame 1204 respectively, the pivot eyeglass frame 1204 may substantially overlap the foundation eyeglass frame 1206, and the user's line of sight.

It is noteworthy that one or more additional alignment elements may be spaced between alignment elements 1214(1) and 1214(2) to enable intermediate angular orientations of the pivot eyeglass frame 1204 relative to the foundation eyeglass frame 1206.

In the illustrated example, the pivot element 1210 and alignment element 1214(1) and 1214(2) of the foundation eyeglass frame 1206 may comprise of magnets that nest within recess seats of the temple arm 1208 and fingerlike protrusion 1212. In other examples, the pivot element 1210 may comprise of any other fastening system that facilitates rotation about an axis perpendicular to adjoining surfaces, such as a screw, bolt, or lock-pin fastening system. Additionally, the alignment elements 1214(1) and 1214(2) may comprise of any fastening system that restricts translation between adjoining surfaces, such as a screw, bolt, lock-pin, or a VELCRO (Registered trademark) fastening system.

Figure 12D:
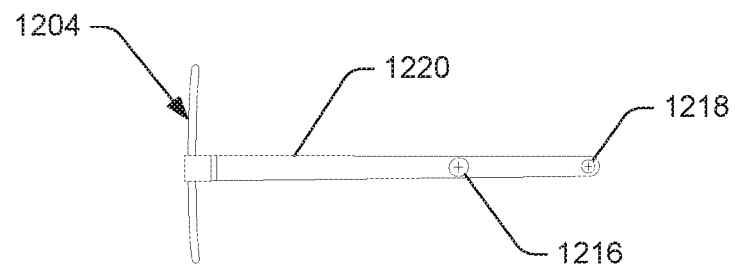
FIG. 12D illustrates an exemplary embodiment of the pivot eyeglass frame as depicted in FIGS. 12A and 12B.

FIG. 12D illustrates an exemplary embodiment of the pivot eyeglass frame 1204 as depicted in FIGS. 12A and 12B. The pivot eyeglass frame 1204 may include the pivot element 1218 and the alignment element 1216 on each pivot arm 1220. The pivot element 1218 may be located substantially near the free end of each pivot arm 1220. Further, the alignment element 1216 may be offset from the pivot element 1218 by a distance that is substantially similar to the offset between the alignment elements 1214(1) or 1214(2) and the pivot element 1210 of the foundation eyeglass frame 1206. In doing so, the alignment element 1216 on each pivot arm 1220 may overlap and selectively couple to one of the alignment elements 1214(1) or 1214(2) while the pivot elements 1210 and 1218 are coupled.

In the illustrated example, the pivot element 1218 and the alignment element 1216 of the pivot eyeglass frame 1204 are magnets that nest within recess seats of each pivot arm 1220. The pivot element 1218 magnet may have a polarity that is substantially opposite to the polarity of the pivot element 1210 magnet of the foundation eyeglass frame 1206. As a result, a magnetic force generated between the pair of pivot element 1210 and 1218 magnets may facilitate rotation of the pivot eyeglass frame 1204 relative to the foundation eyeglass frame 1206. Additionally, the alignment element 1216 magnet of the pivot eyeglass frame 1204 may have a polarity that is substantially opposite to the polarity of the alignment element 1214(1) and 1214(2) magnets of the foundation eyeglass frame 1206. Similarly, a magnetic force generated between the alignment element 1216 magnet and the alignment element 1214(1) or 1214(2) magnet may selectively couple an orientation of the pivot eyeglass frame 1204 to the foundation eyeglass frame 1206.

Furthermore, the pivot element 1218 of the pivot eyeglass frame 1204 may comprise of any fastening system that facilitates rotation about an axis perpendicular to adjoining surfaces, such as a screw, bolt, or lock-pin fastening system. Additionally, the alignment element 1216 of the pivot eyeglass frame 1204 may comprise of any fastening system that restricts translation between adjoining surfaces, such as a screw, bolt, lock-pin, or VELCRO (Registered trademark) fastening system.

Figure 13A:
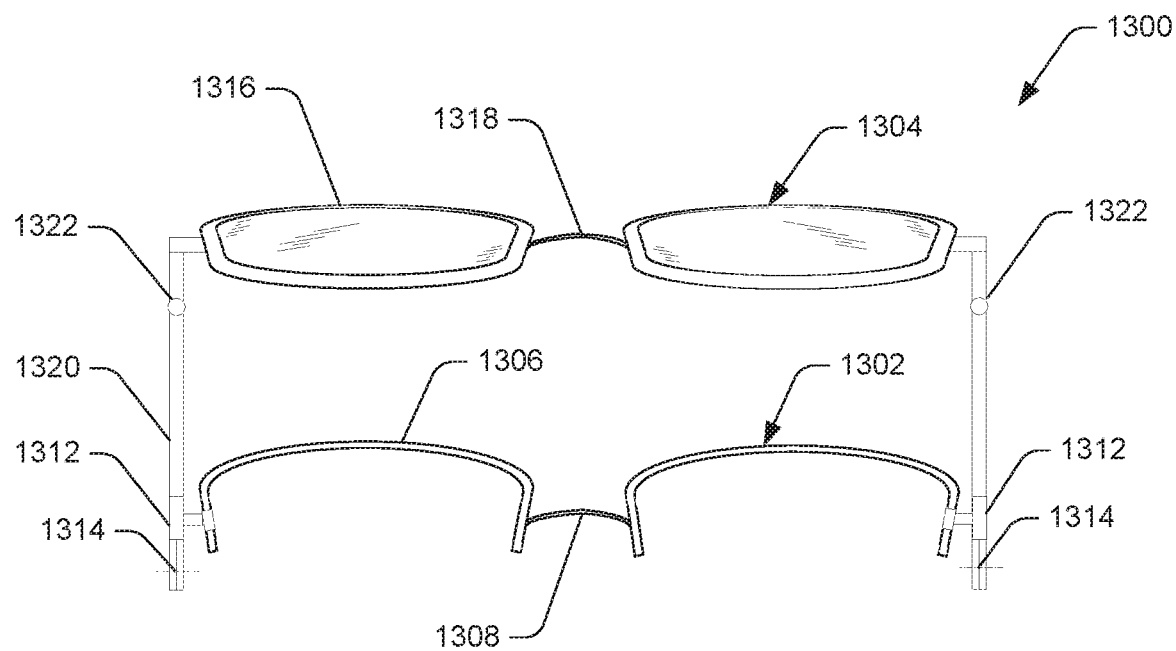
FIGS. 13A and 13B illustrate and additional embodiment of a pair of dual-frame eyeglasses.
Figure 13B:
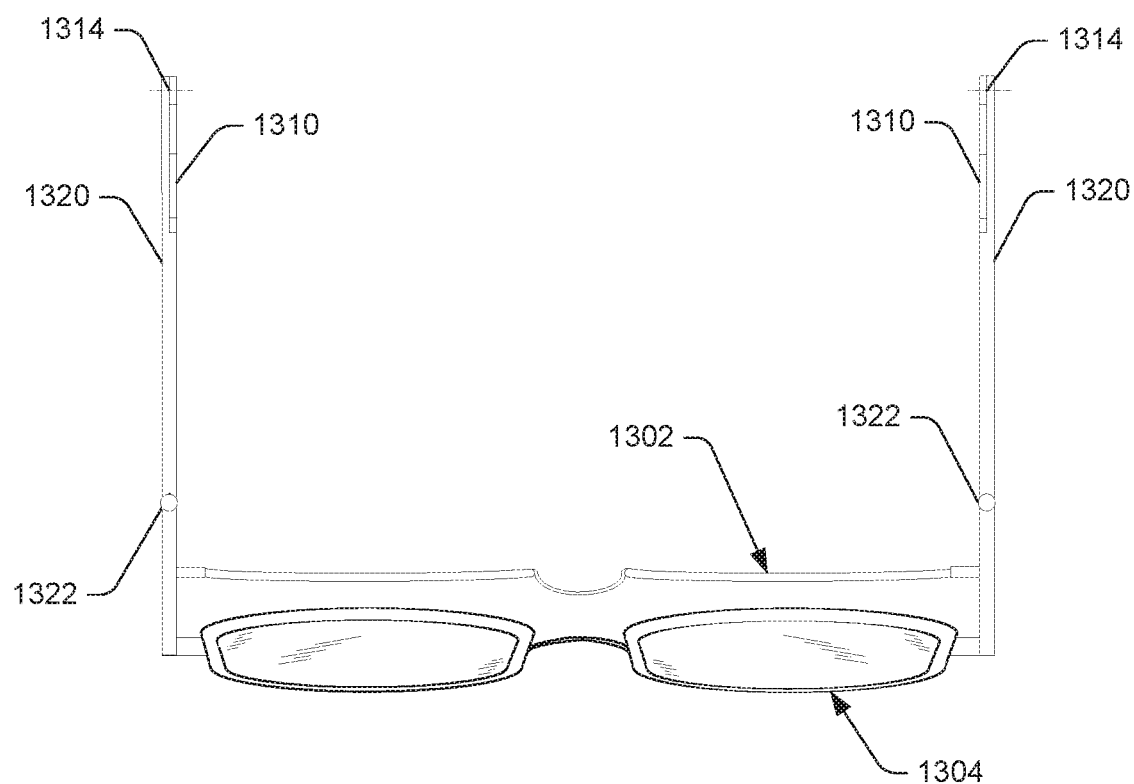

FIGS. 13A and 13B illustrate and additional embodiment of a pair of dual-frame eyeglasses 1300. FIG. 13A illustrates a front view of the pair of dual-frame eyeglasses 1300. FIG. 13B illustrates a plan view of the pair of dual-frame eyeglasses 1300. The dual-frame eyeglasses 1300 may comprise of a foundation eyeglass frame 1302 and a pivot eyeglass frame 1304. The foundation eyeglass frame 1302 may include a foundation-lens support frame 1306 that comprises a left and right portion that are configured to selectively hold a pair of lenses in place in front of a user's line of sight. In some examples, the foundation eyeglass frame 1300 may be configured without a pair of eyeglass lenses installation, as shown in FIG. 13A. Moreover, the foundation eyeglass frame 1302 may include a nose bridge 1308 that is rigidly fixed to the left and right portions of the foundation-lens support frame 1306. The nose bridge 1308 may be formed to contour over a user's nose when the dual-frame eyeglasses 1300 are worn on the user's head.

The foundation eyeglass frame 1302 may further include a pair of template arms 1310, rigidly fixed to a left or right side of the foundation-lens support frame 1306 respectively, via a first pair of hinges 1312. The opposing free end of each temple arm 1310 may be bent to wrap around the back of a user's ear while the dual-frame eyeglasses 1300 are worn on the user's head. Further, a pair of pivot mechanisms 1314 may be selectively fixed to the opposing free ends of each temple arm 1310. The pair of pivot mechanisms 1314 may couple the foundation eyeglass frame 1302 to the pivot eyeglass frame 1304 and further permit the pivot eyeglass frame 1304 to incrementally rotate from an initial position in front of a user's line of sign through to a subsequent position that is angularly offset above the user's line of sight, about the rotational axis of the pivot mechanisms 1314.

In the illustrated example, the pivot eyeglass frame 1304 may include a pivot-lens support frame 1316 that comprises a left and right portion for holding a pair of lenses. The pivot eyeglass frame 1304 may comprise of a pivot-frame nose bridge 1318 that is rigidly fixed to a left and right portion of the pivot-lens support frame 1316. The pivot eyeglass frame 1304 may include a pair of pivot arms 1320. One end of each pivot arm 1320 may be rigidly fixed to a left or right side of the pivot-lens support frame 1316, via a second pair of hinges 1322. The opposing free end of each pivot arm 1320 may be selectively fixed to one of a pair of pivot mechanisms 1314 that permit the pivot eyeglass frame 1304 to rotate relative to the foundation eyeglass frame 1302. The pair of pivot mechanisms 1314 may comprise of fastener and nut combination that secures the mating free ends of each temple arm 1310 and pivot arm 1320, such that each pivot arm 13## may rotate about the fastener axis of the pivot mechanism 1314. Alternatively, the pair of pivot mechanisms 1314 may comprise of a pair of pivot magnets that nest within the free ends of each temple arm 1310 and pivot arm 1320. In this example, pair of pivot magnets may be positioned at the rotational centroid of each pivot mechanism 1314. The pivot magnet of the temple arm 1310 may have a polarity that is opposite to the polarity of the pivot magnet of the pivot arm 1320. The resultant magnetic force may selectively couple the adjoining temple arm 1310 and pivot arm 1320 may simultaneously facilitating rotation of the pivot arm 1320 relative to the template arm 1310, or vice versa.

Figure 14:
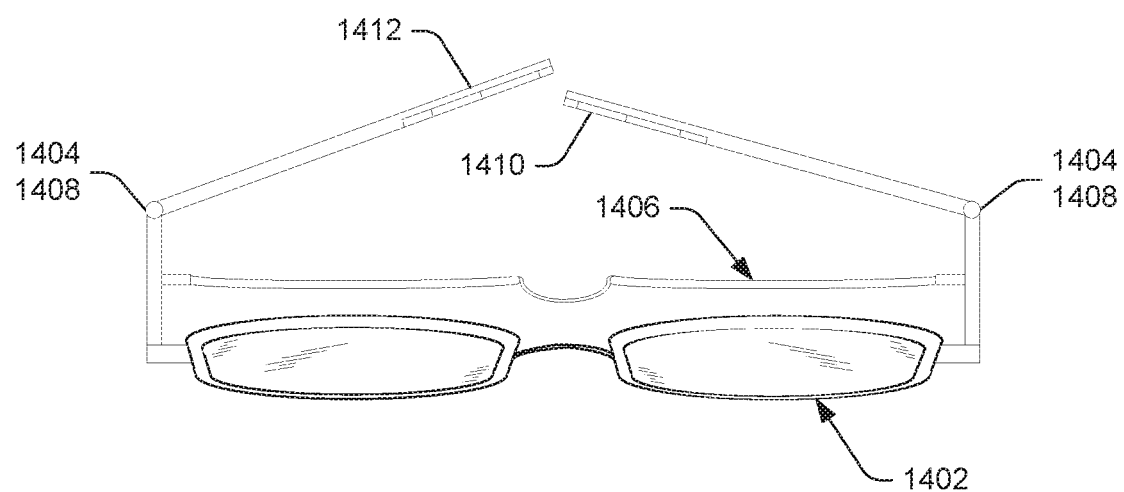
FIG. 14 illustrates an exemplary pair of the dual-frame eyeglasses in a folded configuration.

FIG. 14 illustrates an exemplary pair of the dual-frame eyeglasses 1400 in a folded configuration. The dual-frame eyeglasses 1400 may correspond to the dual-frame eyeglasses 1300. It is noteworthy that when the pivot eyeglass frame 1402 is rotated in the downward direction, such that the lenses of the pivot eyeglass frame 1402 are positioned in front the user's line-of-sight, the first pair of hinges 1404 of the foundation eyeglass frame 1406 and the second pair of hinges 1408 of the pivot eyeglass frame 1402 overlap one another and share the same rotational axis. It is noteworthy that the first pair of hinges 1404 may correspond to the first pair of hinges 1312, and the second pair of hinges 1408 may correspond to the second pair of hinges 1322. In this example, the geometric configuration allows the template arm 1410 of the foundation eyeglass frame 1406 and the pivot arm 1412 of the pivot eyeglass frame 1402 to rotate about their respective hinges 1404 and 1408 at the same time. In this way, the dual-frame eyeglass 1400 may fold into a compact form via rotation about hinges 1408 and 1410.

Figure 15A:
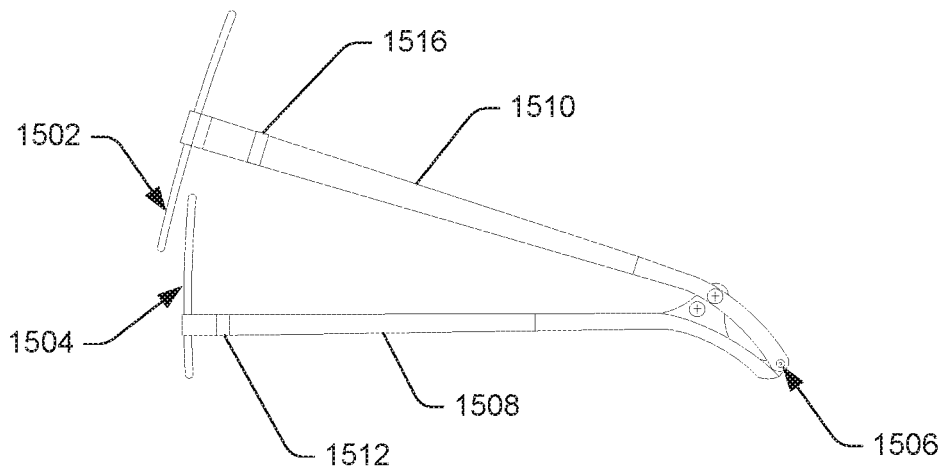
FIGS. 15A and 15B illustrate an additional embodiment of the dual-frame eyeglass showing different angular orientations of the pivot eyeglass frame relative to a foundation eyeglass frame.
Figure 15B:
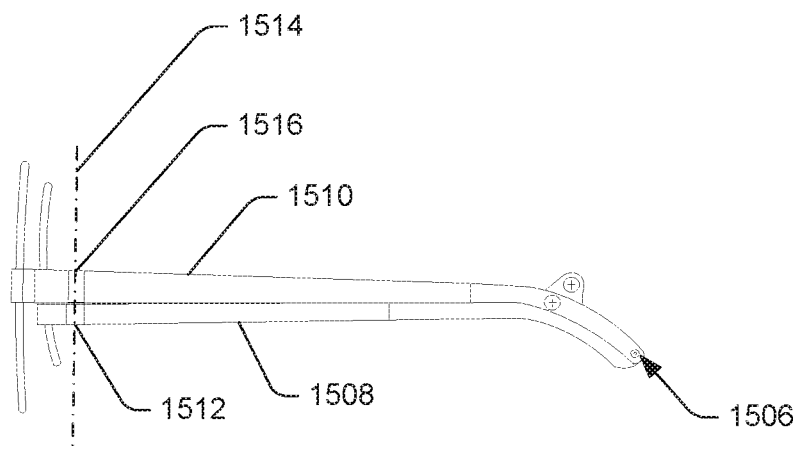

FIGS. 15A and 15B illustrate an additional embodiment of the dual-frame eyeglass 1500 showing different angular orientations of the pivot eyeglass frame 1502 relative to a foundation eyeglass frame 1504. The dual-frame eyeglasses 1500 may correspond to the dual-frame eyeglasses 1300 and/or 1400. FIG. 15A illustrates a first configuration whereby the pivot eyeglass frame 1502 is at a furthermost rotate away from a user's line of sight. The pivot eyeglass frame 1502 may rotate about a pair of pivot points defined by the pivot mechanisms 1506 that are selectively fixed to the free end of each template arm 1508 of the foundation eyeglass frame 1504 and adjoining free end of the pivot arm 1510 of the pivot eyeglass frame 1502.

FIG. 15B illustrates a second configuration of the pivot eyeglass frame 1502 relative to the foundation eyeglass frame 1504, whereby the pivot eyeglass frame 1502 substantially overlaps the foundation eyeglass frame 1504 and the user's line of sight. The pair of pivot mechanisms 1506 may correspond to the pair of pivot mechanisms 1314. It is noteworthy that in the second configuration, the first pair of hinges 1512 of the foundation eyeglass frame 1504 share the same rotational axis 1514 as the second pair of hinges 1516 of the pivot eyeglass frame 1502. Moreover, the first pair of hinges 1512 may correspond to the first pair of hinges 1312 and the second pair of hinges 1516 may correspond to the second pair of hinges 1322.

Figure 16A:
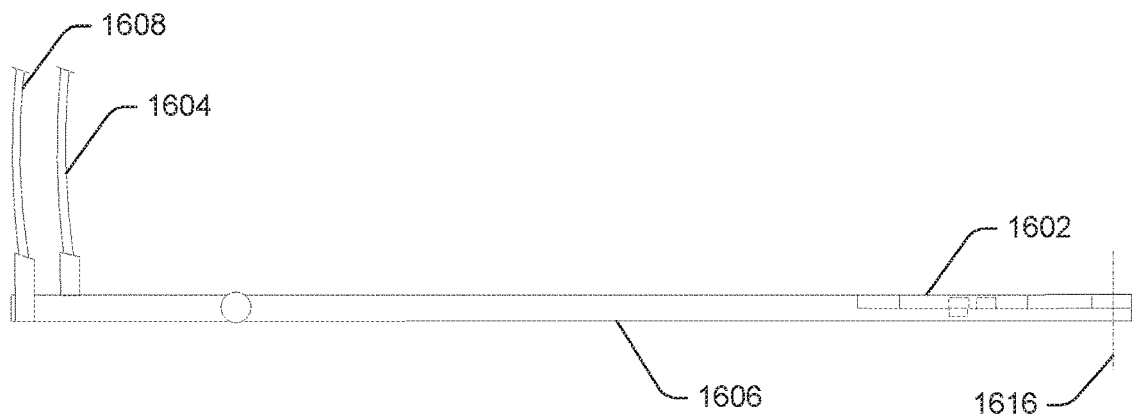
FIGS. 16A through to 16D illustrate a left-hand portion of an additional embodiment of the dual-frame eyeglasses. Particularly.
Figure 16B:
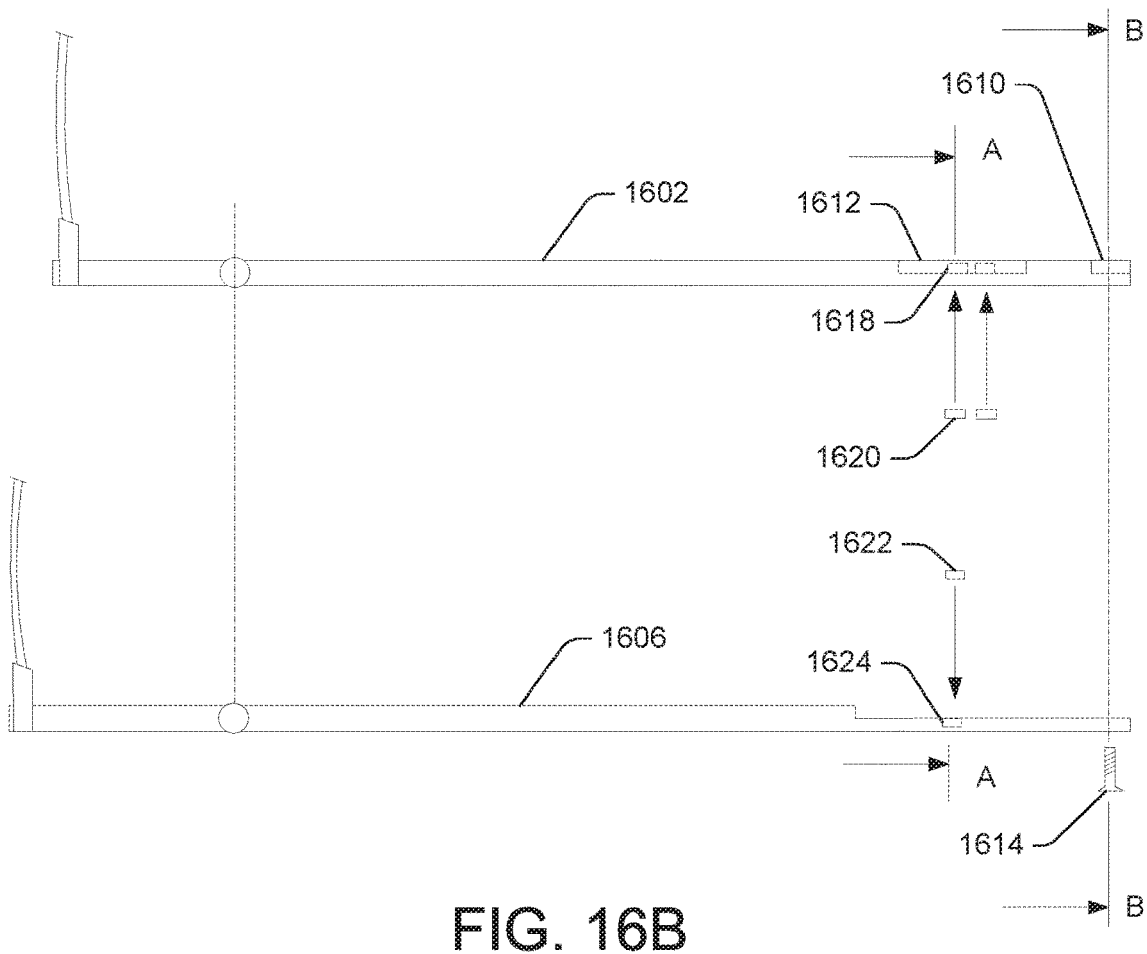
FIG. 16B illustrates an exploded view of the left-hand portion of the dual-frame eyeglasses showing the pivot mechanism at the free ends of the left-hand temple arm and the left-hand pivot arm.

FIGS. 16A through to 16D illustrate a left-hand portion of an additional embodiment of the dual-frame eyeglasses 1600 as described with reference to FIGS. 13A and 13B through to FIGS. 15A and 15B. The dual-frame eyeglasses 1600 may correspond to the dual-frame eyeglasses 1300, 1400, and 1500. Particularly, FIG. 16A illustrates the plan view of an assembly comprising a left-hand temple arm 1602 of the foundation eyeglass frame 1604 and left-hand pivot arm 1606 of the pivot eyeglass frame 1608. FIG. 16B illustrates an exploded view of the left-hand portion of the dual-frame eyeglasses 1600 showing the pivot mechanism at the free ends of the left-hand temple arm 1602 and the left-hand pivot arm 1606. The pivot mechanism may comprise of a first fingerlike protrusion 1610 at the free end of each temple arm 1602 and a second fingerlike protrusion 1612 that is offset along the longitudinal axis of each temple arm 1602 by a predetermined distance from the first fingerlike protrusion 1610. The first fingerlike protrusion 1610 may be integrated into the temple arm 1602 and may selectively couple with the free end of each adjoining pivot arm 1606, thereby facilitating a rotation of the pivot arm 1606 relative to the temple arm 1602.

In one example, the first fingerlike protrusion 1610 may include an opening to receive a fastener 1614 that fixes the free end of the temple arm 1602 to the free end of an adjoining pivot arm 1606. The fastener 1614 may restrict translation of the temple arm 1602 relative to the pivot arm 1606, however may simultaneously facilitate rotation of the pivot arm 1606 relative to the temple arm 1602. In another example, the first fingerlike protrusion 1610 may include a recess seat (not shown) etched into a mating surface that abuts the free end of the adjoining pivot arm 1606. The recess seat may receive a magnet that, in part, may facilitate a coupling between the free ends of the temple arm 1602 and the pivot arm 1606.

Further, the second fingerlike protrusion 1612 may include one or more magnets that may selectively couple each pivot arm 1606 of the pivot eyeglass frame 1608 to a corresponding temple arm 1602 of the foundation eyeglass frame 1604, while each pivot arm 1606 may rotate relative to each temple arm 1602, about the pivot mechanism 1616. The second fingerlike protrusion 1612 may include a first plurality of recess seats 1618 etched into a mating surface of the temple arm 1602 that abuts the adjoining pivot arm 1606 of the pivot eyeglass frame 1608. Each of the first plurality of recess seats 1618 may receive a first magnet 1620 that, in part, may facilitate a coupling between the pivot arm 1606 and the temple arm 1602 in one or more orientations of the pivot arm 1606 relative to the temple arm 1602. In the illustrated example, the second fingerlike protrusion 1612 includes two recess seats, however any number of recess seats are possible.

Moreover, the pivot arm 1606 of the pivot eyeglass frame 1608 may include an opening to receive a fastener 1614 that fixes the free end of the pivot arm 1606 to the free end of an adjoining temple arm 1602. In another example, the free end of the pivot arm 1606 may include a recess seat etched into a mating surface that abuts the free end of the adjoining temple arm 1602 of the foundation eyeglass frame 1604. The recess seat may receive a magnet that, in part, may facilitate a coupling between the free ends of the temple arm 1602 and the pivot arm 1606.

Further, the pivot arm 1606 may include a second magnet 1622 that is offset along its longitudinal axis by a predetermined distance from the opening at the free end of the pivot arm 1606. The second magnet 1622 may be positioned along a longitudinal axis of the pivot arm such that it overlaps the one or more magnets of the second fingerlike protrusion 1612 of the temple arm 1602. The second magnet 1622 may be installed within a second recess seat 1624 that is etched into a mating surface of the pivot arm 1606 that abuts the adjoining temple arm 1602 of the foundation eyeglass frame 1604. It is noteworthy that the polarity of the first magnet 1620 may be opposite to the polarity of the second magnet 1622. The resultant magnetic force may selectively couple the adjoining temple arm 1602 and pivot arm 1606.

Figure 16C:
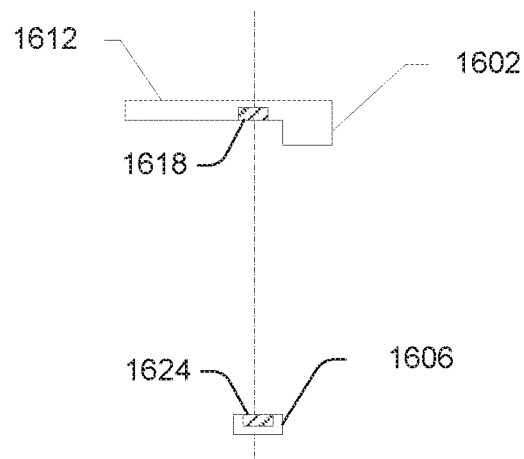
FIG. 16C illustrates a cross-sectional view through Section A-A of FIG. 16B.

FIG. 16C illustrates a cross-sectional view through Section A-A of FIG. 16B. More specifically, FIG. 16C illustrates a cross-sectional view through the second fingerlike protrusion 1612 of the temple arm 1602. In the illustrated example, a first recess seat 1618 is etched into the mating surface of the temple arm 1602 (more specifically, the first recess seat 1618 is etched into the mating surface of the second fingerlike protrusion 1612) to receive a first magnet 1620. Further, a second recess seat 1624 is etched into a mating surface of the pivot arm 1606 that abuts the adjoining temple arm 1602 to receive the second magnet 1622.

Figure 16D:
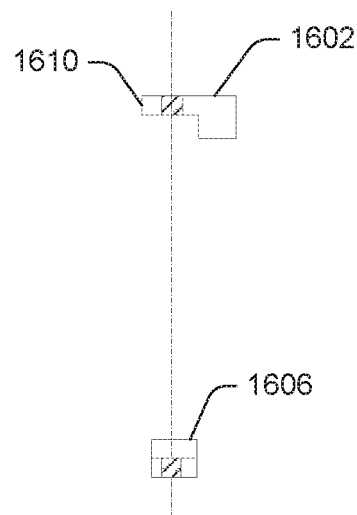
FIG. 16D illustrates a cross-section view through Section B-B of FIG. 16B.

FIG. 16D illustrates a cross-sectional view through Section B-B of FIG. 16B. More specifically, FIG. 16D illustrates a cross-sectional view through the first fingerlike protrusion 1610 at the free end of the temple arm 1602. As shown, the first fingerlike protrusion 1610 may be integrated into the temple arm 1602 and may selectively couple with the free end of each adjoining pivot arm 1606, thereby facilitating a rotation of the pivot arm 1606 relative to the temple arm 1602. In the illustrated example, first fingerlike protrusion 1610 may include an opening to receive a fastener 1614 that fixes the free end of the temple arm 1602 at the first fingerlike protrusion 1610, to the free end of an adjoining pivot arm 1606. Alternatively, the first fingerlike protrusion 1610 may include a recess seat etched into a mating surface that abuts the free end of the adjoining pivot arm 1606. The recess seat may receive a magnet that, in part, may facilitate a coupling between the free ends of the temple arm 1602 and the pivot arm 1606.

Figure 17A:
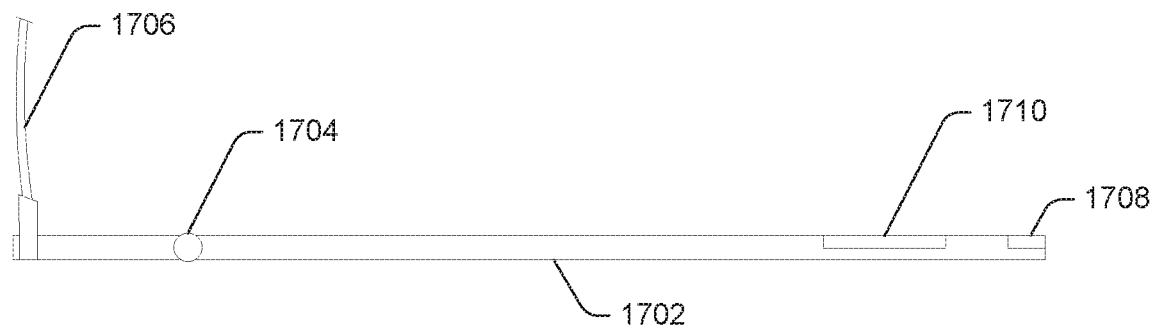
FIGS. 17A and 17B illustrate an additional embodiment of the temple arm of the foundation eyeglass frame of the dual eyeglass frame. More specifically.
Figure 17B:
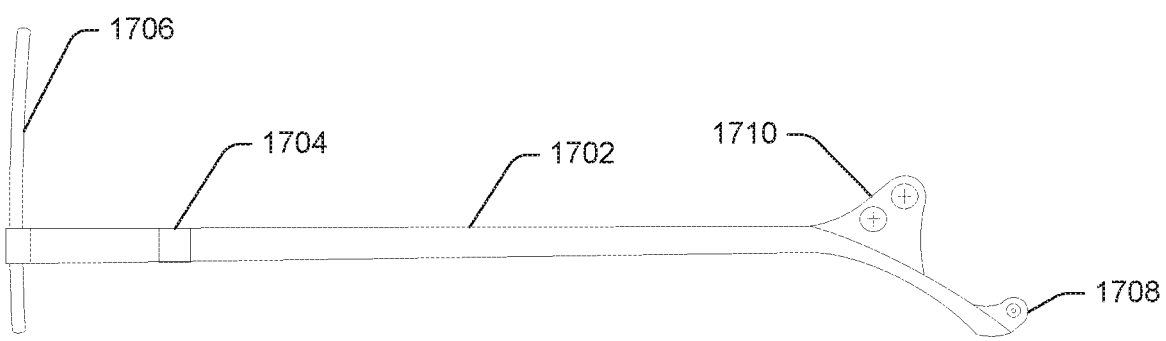

FIGS. 17A and 17B illustrate an additional embodiment of the temple arm 1702 of the foundation eyeglass frame of the dual eyeglass frame as described with reference to FIGS. 13A and 13B through to FIGS. 15A and 15B. More specifically, FIG. 17A illustrates a plan view of the temple arm 1702 of the foundation eyeglass frame and FIG. 17B illustrates a side view of the temple arm 1702. The temple arm 1702 may correspond to the temple arm 1310, 1410, 1508, and 1602. In the illustrated example, the temple arm 1702 may include a hinge 1704 positioned near the foundation-lens support frame 1706 to support folding of the temple arm 1702. The hinge 1704 may correspond to one of the first pair of hinges 1312 and the foundation-lens support frame 1706 may correspond to the foundation-lens support frame 1306. The temple arm 1702 may further include a first fingerlike protrusion 1708 at an opposite free end and a second fingerlike protrusion 1710 that is offset along the longitudinal axis of the temple arm 1702 by a predetermined distance from the first fingerlike protrusion 1708. The first fingerlike protrusion 1708 may be integrated into the temple arm 1702, thereby facilitating a rotation of a pivot arm of a pivot eyeglass frame relative to the temple arm 1702. The first fingerlike protrusion 1708 may correspond to the first fingerlike protrusion 1710. Further, the first fingerlike protrusion 1708 may have a thickness that is one half of the thickness of the temple arm 1702. In this way, an adjoining pivot arm, having the same thickness (i.e. one half of the thickness of the temple arm 1702), may abut the first fingerlike protrusion 1708 of the temple arm 1702 and remain within the overall thickness profile of the temple arm 1702.

Moreover, the second fingerlike protrusion 1710 may include a plurality of recess seats to receive a corresponding number of magnets. The second fingerlike protrusion 1710 may correspond to the second fingerlike protrusion 1612. The recess seats may be orientated to facilitate a coupling between the temple arm 1702 of the foundation eyeglass frame and the corresponding pivot arm of the pivot eyeglass frame. Similar to the first fingerlike protrusion 1708, the second fingerlike protrusion 1710 may have a thickness that is one half of the thickness of the temple arm 1702. In this way, an adjoining pivot arm, having the same thickness (i.e. one half of the thickness of the temple arm 1702), may abut the second fingerlike protrusion 1710 of the temple arm 1702 and remain within the overall thickness profile of the temple arm 1702.

Figure 18A:
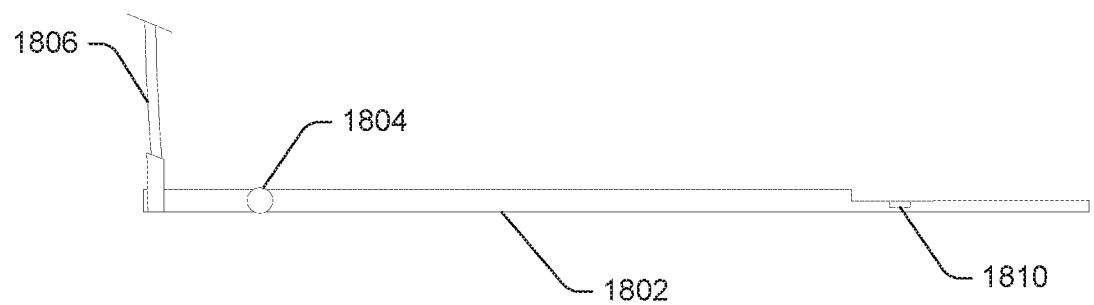
FIGS. 18A and 18B illustrate an additional embodiment of the pivot arm of the pivot eyeglass frame of the dual eyeglass frame. More specifically.
Figure 18B:
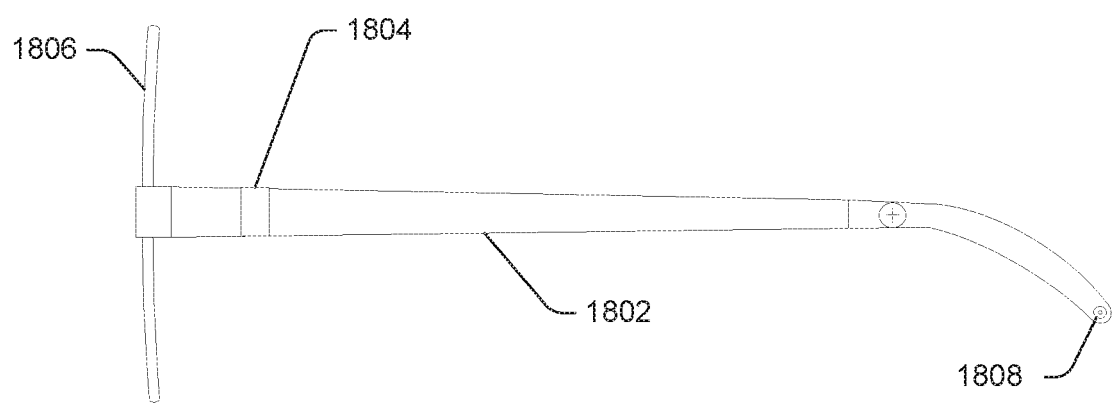

FIGS. 18A and 18B illustrate an additional embodiment of the pivot arm of the pivot eyeglass frame of the dual eyeglass frame as described with reference to FIGS. 13A and 13B through to FIGS. 15A and 15B. More specifically, FIG. 18A illustrates a plan of the pivot arm 1802 of the pivot eyeglass frame and FIG. 18B illustrates a side view of the pivot arm 1802. The pivot arm 1802 may correspond to the pivot arm 1320, 1412, 1510, and 1606. In the illustrated example, the pivot arm 1802 may include a hinge 1804 positioned near the pivot-lens support frame 1806 to support folding of the pivot arm 1802. The hinge 1804 may correspond to one of the second pair of hinges 1322, and the pivot-lens support frame 1806 may correspond to 1316. The pivot arm 1802 may further include an opening at the free end of the pivot arm to facilitate a pivot mechanism that enables a rotation of the pivot arm 1802 relative to an adjoining temple arm. The opening 1808 may be sized to receive a fastener that fixes the free end of the pivot arm 1802 to the free end of an adjoining temple arm. Alternatively, the opening 1808 may correspond to a first recess seat (not shown) etched into a mating surface of the pivot arm 1802 that abuts an adjoining temple arm. The first recess seat may receive a magnet that, in part, may facilitate a coupling between the free ends of the pivot arm 1802 and the adjoining temple arm.

Further, the pivot arm 1802 may further include a second recess seat 1810 that is positioned along a longitudinal axis of the pivot arm 1802 such that it overlaps one or more magnets of a second fingerlike protrusion of an adjoining temple arm. The second recess seat 1810 may be etched into a mating surface of the pivot arm 1802 that abuts the adjoining temple arm of the foundation eyeglass frame to receive a magnet that, in part, may facilitate a coupling between the pivot arm 1802 and the adjoining temple arm.

Moreover, the pivot arm 1802 may have a thickness that is one half of the thickness of an adjoining temple arm. In this way, the pivot arm 1802 may abut a first fingerlike protrusion and a second fingerlike protrusion of the adjoining temple arm and remain within the overall thickness profile of the temple arm.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A pair of dual-frame eyeglasses, comprising:
    a pivot eyeglass frame comprising:
        a left focus lens unit and a right focus lens unit;
        a left pivot arm, the left pivot arm further comprising a first left pivot arm end and a second left pivot arm end, the first left pivot arm end being rigidly fixed to a left outer portion of the left focus lens unit via a first left hinge, and the second left pivot arm end of the left pivot arm being rigidly fixed to a left pivot mechanism, the left pivot arm having a pivot thickness dimension that is measured perpendicular to a centroidal axis of the first left hinge;
        a right pivot arm that is a mirror image of the left pivot arm;
    a foundation eyeglass frame comprising:
        a left temple arm that is configured to rest on a head of a wearer of the pair of dual-frame eyeglasses, the left temple arm having a first left temple arm end and a second left temple arm end, wherein the first left temple arm end is rigidly fixed to a left outer portion of the foundation eyeglass frame via a second left hinge, and the second left temple arm end is rigidly fixed to the left pivot mechanism, the left temple arm having a temple thickness dimension that is measured perpendicular to the centroidal axis of the first left hinge, the temple thickness dimension being double the pivot thickness dimension;
        a right temple arm that is the mirror image of the left temple arm; and
        the left pivot mechanism being configured to selectively couple the left pivot arm and the left temple arm via a magnetic interaction between a first set of magnets that are rigidly fixed to the left temple arm and a second set of magnets that are rigidly fixed to the left pivot arm, wherein a first number of magnets of the first set of magnets is double that of a second number of magnets of the second set of magnets, and wherein, a right pivot mechanism is the mirror image of the left pivot mechanism.

2. The pair of dual-frame eyeglasses of claim 1, wherein the first set of magnets have a first polarity and the second set of magnets have a second polarity that is opposite the first polarity.

3. The pair of dual-frame eyeglasses of claim 1, wherein the left pivot mechanism is configured to restrict translational movement of the left pivot arm.

4. The pair of dual-frame eyeglasses of claim 1, wherein the left focus lens unit is a first left focus lens unit and the right focus lens unit is a first right focus lens unit, and
    wherein the foundation eyeglass frame further comprises a second left focus lens unit and a second right focus lens unit.

5. The pair of dual-frame eyeglasses of claim 1, wherein the left pivot mechanism is configured to restrict translational movement of the left pivot arm relative to the left temple arm.

6. The pair of dual-frame eyeglasses of claim 1, wherein the left temple arm further includes a left protrusion that is part of the left pivot mechanism, the left protrusion having a protrusion thickness dimension that is half the temple thickness dimension.

7. The pair of dual-frame eyeglasses of claim 6, wherein the left temple arm has a left temple inner surface and a left temple outer-surface that are perpendicular to the temple thickness dimension, the left temple inner-surface abutting the head of the wearer of the pair of dual-frame eyeglasses,
    wherein, the left protrusion has a left protrusion inner-surface and a left protrusion outer surface that are perpendicular to the temple thickness dimension, and
    wherein, the left protrusion inner-surface is coplanar with the left temple inner-surface.

8. The pair of dual-frame eyeglasses of claim 6, wherein the left pivot arm has a left pivot inner-surface and a left pivot outer-surface that are perpendicular to the pivot thickness dimension and wherein the left protrusion has a left protrusion inner-surface and a left protrusion outer-surface that are perpendicular to the protrusion thickness dimension, the left pivot inner-surface abutting the left protrusion outer-surface.

9. The pair of dual-frame eyeglasses of claim 8, wherein the left temple arm has a left temple inner-surface and a left temple outer-surface, and
    wherein the pivot thickness dimension does not extend beyond the left temple outer-surface in response to the left pivot inner-surface abutting the left protrusion outer-surface.

* * * * *